US011222137B2

(12) United States Patent
Murdoch et al.

(10) Patent No.: US 11,222,137 B2
(45) Date of Patent: Jan. 11, 2022

(54) STORING AND EXECUTING AN APPLICATION IN A USER'S PERSONAL STORAGE WITH USER GRANTED PERMISSION

(71) Applicant: MICROSOFT TECHNOLOGY LICENSING, LLC, Redmond, WA (US)

(72) Inventors: Brandon Murdoch, Reading (GB); Daniel James Buchner, Los Gatos, CA (US); Ankur Patel, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 200 days.

(21) Appl. No.: 16/402,508

(22) Filed: May 3, 2019

(65) Prior Publication Data
US 2020/0349276 A1 Nov. 5, 2020

(51) Int. Cl.
*G06F 21/62* (2013.01)

(52) U.S. Cl.
CPC .................. *G06F 21/6245* (2013.01)

(58) Field of Classification Search
CPC ............................ G06F 21/51; G06F 21/6245
See application file for complete search history.

(56) References Cited

U.S. PATENT DOCUMENTS

| | | | |
|---|---|---|---|
| 8,650,303 | B1 | 2/2014 | Lang et al. |
| 8,744,064 | B1 | 6/2014 | Calahan et al. |
| 8,793,509 | B1 | 7/2014 | Nelson et al. |
| 8,959,579 | B2 | 2/2015 | Barton et al. |
| 9,680,824 | B1 | 6/2017 | Rodgers et al. |
| 10,148,643 | B2 | 12/2018 | Niemela et al. |
| 10,454,927 | B2 * | 10/2019 | Oberhauser .............. G07C 9/32 |
| 10,506,104 | B1 | 12/2019 | Shakeri |
| 10,572,684 | B2 * | 2/2020 | LaFever .............. G06F 21/6254 |
| 10,764,752 | B1 | 9/2020 | Avetisov et al. |

(Continued)

FOREIGN PATENT DOCUMENTS

| | | |
|---|---|---|
| WO | 2016060907 A1 | 4/2016 |
| WO | 2018126029 A2 | 7/2018 |

OTHER PUBLICATIONS

"International Search Report and Written Opinion Issued in PCT Application No. PCT/US2020/023051", dated May 12, 2020, 14 Pages.

(Continued)

*Primary Examiner* — Harris C Wang
(74) *Attorney, Agent, or Firm* — Workman Nydegger

(57) ABSTRACT

Storing and executing an application in a personal storage with a user-granted permission in a decentralized network that implements a distributed edger. First, receiving a request from an entity for storing an application in a data storage that is associated with a DID owner. The application is configured to use data stored in the data storage as one or more inputs to generate one or more results. Next, one or more characteristics of the application associated with the entity is identified. Based on identified one or more characteristics, a write permission is to be granted to the entity, and the application is stored in the data storage. Thereafter, the application stored in the data storage is executed using data stored in the data storage.

20 Claims, 10 Drawing Sheets

(56) References Cited

U.S. PATENT DOCUMENTS

| | | |
|---|---|---|
| 2004/0019807 A1 | 1/2004 | Freund |
| 2004/0098366 A1* | 5/2004 | Sinclair ............... G06F 21/6245 |
| 2004/0128240 A1 | 7/2004 | Yusin |
| 2004/0205243 A1 | 10/2004 | Hurvig et al. |
| 2005/0251792 A1* | 11/2005 | Smith ................ G06F 11/3476 |
| | | 717/131 |
| 2006/0075381 A1 | 4/2006 | Laborczfalvi et al. |
| 2006/0174350 A1 | 8/2006 | Roever et al. |
| 2008/0134310 A1 | 6/2008 | Borde et al. |
| 2009/0271840 A1 | 10/2009 | Gillet et al. |
| 2010/0077445 A1 | 3/2010 | Schneider et al. |
| 2010/0122343 A1 | 5/2010 | Ghosh et al. |
| 2012/0017213 A1 | 1/2012 | Hunt et al. |
| 2013/0332694 A1 | 12/2013 | Reissner |
| 2014/0007157 A1 | 1/2014 | Harrison et al. |
| 2014/0025949 A1 | 1/2014 | Kay et al. |
| 2014/0173709 A1 | 6/2014 | Eldar et al. |
| 2014/0280888 A1 | 9/2014 | Mcmillan |
| 2014/0280955 A1 | 9/2014 | Stuntebeck et al. |
| 2014/0344420 A1 | 11/2014 | Rjeili et al. |
| 2014/0359729 A1 | 12/2014 | Kreiner et al. |
| 2015/0007265 A1 | 1/2015 | Aissi et al. |
| 2015/0186536 A1 | 7/2015 | Bosworth et al. |
| 2015/0186664 A1 | 7/2015 | Nicolaou |
| 2015/0186669 A1 | 7/2015 | Nicolaou |
| 2015/0235043 A1 | 8/2015 | Haik et al. |
| 2015/0332533 A1 | 11/2015 | Meganck |
| 2015/0356317 A1 | 12/2015 | Ukil et al. |
| 2016/0063239 A1 | 3/2016 | Chen et al. |
| 2016/0065579 A1 | 3/2016 | Chen et al. |
| 2016/0098577 A1 | 4/2016 | Lacey et al. |
| 2016/0140362 A1 | 5/2016 | Aghili et al. |
| 2016/0173281 A1 | 6/2016 | White et al. |
| 2016/0224360 A1 | 8/2016 | Wagner et al. |
| 2016/0239795 A1 | 8/2016 | Burch et al. |
| 2016/0342786 A1 | 11/2016 | Gerebe |
| 2017/0033930 A1 | 2/2017 | Costa et al. |
| 2017/0097851 A1 | 4/2017 | Chen |
| 2017/0099291 A1 | 4/2017 | Clark et al. |
| 2017/0111175 A1* | 4/2017 | Oberhauser ........... H04L 63/126 |
| 2017/0161439 A1* | 6/2017 | Raduchel ............... H04W 12/06 |
| 2017/0180346 A1 | 6/2017 | Suarez et al. |
| 2017/0201490 A1 | 7/2017 | Kinder et al. |
| 2017/0250853 A1 | 8/2017 | Evans |
| 2017/0300394 A1 | 10/2017 | Raut |
| 2017/0316390 A1 | 11/2017 | Smith et al. |
| 2017/0317833 A1 | 11/2017 | Smith et al. |
| 2017/0317948 A1 | 11/2017 | Ilaiwi et al. |
| 2017/0353496 A1 | 12/2017 | Pai et al. |
| 2018/0060496 A1* | 3/2018 | Bulleit .................. H04L 9/3239 |
| 2018/0082053 A1 | 3/2018 | Brown et al. |
| 2018/0097780 A1* | 4/2018 | Olivier ................. H04W 12/02 |
| 2018/0101842 A1 | 4/2018 | Ventura et al. |
| 2018/0137512 A1 | 5/2018 | Georgiadis et al. |
| 2018/0139238 A1 | 5/2018 | Schultz et al. |
| 2018/0165183 A1 | 6/2018 | Kremp |
| 2018/0176775 A1 | 6/2018 | Obaidi |
| 2018/0198824 A1 | 7/2018 | Pulapaka et al. |
| 2018/0220397 A1 | 8/2018 | Paredes Cabrera et al. |
| 2018/0234422 A1 | 8/2018 | Odom et al. |
| 2018/0239897 A1 | 8/2018 | Ventura |
| 2018/0260404 A1 | 9/2018 | Otis et al. |
| 2018/0285156 A1 | 10/2018 | Corey et al. |
| 2018/0285217 A1 | 10/2018 | Smith et al. |
| 2018/0285594 A1* | 10/2018 | Jarvis, II ............. G06F 21/6245 |
| 2018/0294956 A1 | 10/2018 | O'brien et al. |
| 2018/0300499 A1 | 10/2018 | Agarwal et al. |
| 2018/0307859 A1 | 10/2018 | Lafever et al. |
| 2018/0330081 A1 | 11/2018 | Hua et al. |
| 2018/0351747 A1* | 12/2018 | Spangemacher ....... H04L 63/08 |
| 2018/0367528 A1 | 12/2018 | Schwarz et al. |
| 2019/0012105 A1 | 1/2019 | Schreter |
| 2019/0012706 A1 | 1/2019 | Navin et al. |
| 2019/0028455 A1 | 1/2019 | Yue et al. |
| 2019/0034617 A1 | 1/2019 | Scarlata et al. |
| 2019/0034920 A1 | 1/2019 | Nolan et al. |
| 2019/0050855 A1 | 2/2019 | Martino et al. |
| 2019/0097812 A1* | 3/2019 | Toth ...................... H04L 9/3213 |
| 2019/0098019 A1 | 3/2019 | Coleman et al. |
| 2019/0108116 A1 | 4/2019 | Benes et al. |
| 2019/0116188 A1* | 4/2019 | Praszczalek .......... H04L 67/306 |
| 2019/0121980 A1 | 4/2019 | Jung et al. |
| 2019/0130405 A1 | 5/2019 | Adams et al. |
| 2019/0146816 A1 | 5/2019 | Reno et al. |
| 2019/0149341 A1 | 5/2019 | Robison et al. |
| 2019/0158536 A1 | 5/2019 | Kraemer et al. |
| 2019/0188094 A1 | 6/2019 | Ramamoorthi et al. |
| 2019/0251278 A1 | 8/2019 | Kalinichenko et al. |
| 2019/0253523 A1 | 8/2019 | Raduchel et al. |
| 2019/0278887 A1 | 9/2019 | Ramanujam et al. |
| 2019/0305964 A1 | 10/2019 | Hamel et al. |
| 2019/0305967 A1* | 10/2019 | Hamel ............... G07C 9/00857 |
| 2019/0318122 A1 | 10/2019 | Hockey et al. |
| 2019/0319940 A1 | 10/2019 | Hamel et al. |
| 2019/0333054 A1* | 10/2019 | Con ........................ G06F 21/31 |
| 2019/0349371 A1 | 11/2019 | Smith et al. |
| 2019/0349372 A1 | 11/2019 | Smith et al. |
| 2019/0354389 A1 | 11/2019 | Du et al. |
| 2020/0004451 A1 | 1/2020 | Prohofsky |
| 2020/0021590 A1 | 1/2020 | Jeuk et al. |
| 2020/0021615 A1 | 1/2020 | Wainner et al. |
| 2020/0034170 A1 | 1/2020 | Chen et al. |
| 2020/0034548 A1 | 1/2020 | Wu et al. |
| 2020/0036519 A1 | 1/2020 | Bitauld et al. |
| 2020/0067907 A1 | 2/2020 | Avetisov et al. |
| 2020/0082071 A1 | 3/2020 | Cherny et al. |
| 2020/0119906 A1 | 4/2020 | Das et al. |
| 2020/0125721 A1 | 4/2020 | Antony et al. |
| 2020/0125738 A1 | 4/2020 | Mahatwo et al. |
| 2020/0134656 A1 | 4/2020 | Padmanabhan |
| 2020/0137064 A1* | 4/2020 | Wu ........................ H04L 63/102 |
| 2020/0159634 A1 | 5/2020 | Gadgil et al. |
| 2020/0159940 A1 | 5/2020 | Werner et al. |
| 2020/0195437 A1 | 6/2020 | Gallagher |
| 2020/0204557 A1 | 6/2020 | Singh et al. |
| 2020/0211409 A1* | 7/2020 | Latorre .................. G16H 20/30 |
| 2020/0226285 A1* | 7/2020 | Bulleit ................... G06F 21/33 |
| 2020/0233760 A1 | 7/2020 | Wu et al. |
| 2020/0244469 A1 | 7/2020 | Riyumkin et al. |
| 2020/0250323 A1 | 8/2020 | Remington et al. |
| 2020/0279257 A1* | 9/2020 | Cheng ................. G06F 21/6245 |
| 2020/0280855 A1 | 9/2020 | Avetisov et al. |
| 2020/0296102 A1 | 9/2020 | Buchner et al. |
| 2020/0304480 A1 | 9/2020 | Buchner et al. |
| 2020/0304560 A1 | 9/2020 | Buchner et al. |
| 2020/0313897 A1 | 10/2020 | Heath et al. |
| 2020/0320220 A1* | 10/2020 | Beno .................... G06F 21/6245 |
| 2020/0327546 A1 | 10/2020 | Pennington et al. |
| 2020/0334114 A1 | 10/2020 | Murdoch et al. |
| 2020/0336483 A1 | 10/2020 | Murdoch et al. |
| 2020/0342136 A1 | 10/2020 | Murdoch et al. |
| 2020/0344237 A1 | 10/2020 | Murdoch et al. |
| 2020/0349256 A1 | 11/2020 | Murdoch et al. |
| 2020/0349276 A1* | 11/2020 | Murdoch ............ G06F 21/6245 |
| 2020/0351271 A1 | 11/2020 | Murdoch et al. |
| 2020/0374113 A1 | 11/2020 | Noam et al. |
| 2021/0014060 A1 | 1/2021 | Georgiadis et al. |
| 2021/0044976 A1 | 2/2021 | Avetisov et al. |
| 2021/0160318 A1 | 5/2021 | Sajeepa et al. |

OTHER PUBLICATIONS

Vossaert, et al., "User-centric identity management using trusted modules", In Mathematical and Computer Modelling, vol. 57, Issues 7-8, Jun. 30, 2012, 16 Pages.

"International Search Report and Written Opinion Issued in PCT Application No. PCT/US20/024528", dated Jun. 17, 2020, 11 Pages.

Sporny, "Verifiable Credentials Data Model 1.0", Retrieved from: https://www.w3.org/TR/2019/CR-verifiable-claims-data-model-20190328/#sharing-information-with-the-wrong-party, Mar. 28, 2019, 95 Pages.

(56) References Cited

OTHER PUBLICATIONS

"Non Final Office Action Issued in U.S. Appl. No. 16/387,380", dated Feb. 5, 2021, 20 Pages.
Siano, et al., "A Survey and Evaluation of the Potentials of Distributed Ledger Technology for Peer-to-Peer Transactive Energy Exchanges in Local Energy Markets", In IEEE Systems Journal, vol. 13, Issue 3, Sep. 2019, 13 Pages.
Stutsman, Ryans., "Durability and Crash Recovery in Distributed In-Memory Storage Systems", In a Dissertation Submitted to the Department of Computer Science of Stanford University, Nov. 2013, 146 Pages.
"Non Final Office Action Issued in U.S. Appl. No. 16/397,765", dated Oct. 29, 2020, 21 Pages.
"Non Final Office Action Issued in U.S. Appl. No. 16/403,271", dated Oct. 27, 2020, 28 Pages.
"Non Final Office Action Issued in U.S. Appl. No. 16/402,502", dated Sep. 8, 2020, 13 Pages.
Barbir, Abbie, Updated text for X.dlt-sec, "Security considerations for using DLT Data in Identity Management", In International Telecommunication Union, SG17-C-0471, Study Group 17, vol. 14/17, Jan. 22, 2019, 19 Pages.
Barbir, Abbie, Updated text of draft Recommendation ITU-T X.1252 "Baseline Identity Management Terms and Definitions", In International Telecommunication Union, T17-SG17-C-0472, Study Group 17, vol. 10/17, Jan. 22, 2019, 27 Pages.
"Why Decentralized Identifiers are Changing the Future of the Internet, Identity and Finance—SelfKey", Retrieved From: https://selfkey.org/decentralized-identifiers-article/, Apr. 11, 2019, 12 Pages.
Harker, Andy, "Symbian OS Platform Security/08. Native Software Installer", Retrieved From: http://web.archive.org/web/20111031110549/http://wiki.franklinheath.co.uk/index.php/Symbian_OS_Platform_Security/08._Native_Software_Installer, Oct. 31, 2011, 19 Pages.
Hughes, et al., "A Primer for Decentralized Identifiers", Retrieved From: https://w3c-ccg.github.io/did-primer/#did-documents, Jan. 19, 2019, 7 Pages.
Lewis, Antony, "A Gentle Introduction to Self-Sovereign Identity", Retrieved From: https://bitsonblocks.net/2017/05/17/gentle-introduction-self-sovereign-identity/, May 17, 2017, 19 Pages.
Locher, et al., "When Can a Distributed Ledger Replace a Trusted Third Party?", In Repository of arXiv:1806.10929, Jun. 28, 2018, 9 Pages.
"International Search Report and Written Opinion Issued in PCT Application No. PCT/US20/020586", dated Jun. 26, 2020, 13 Pages.
"International Search Report and Written Opinion Issued in PCT Application No. PCT/US20/020719", dated Jun. 8, 2020, 14 Pages.
"International Search Report and Written Opinion Issued in PCT Application No. PCT/US20/023225", dated Jun. 17, 2020, 14 Pages.
"International Search Report and Written Opinion Issued in PCT Application No. PCT/US20/024364", dated Jun. 26, 2020, 13 Pages.
"International Search Report and Written Opinion Issued in PCT Application No. PCT/US20/024365", dated Jun. 29, 2020, 14 Pages.
"Final Office Action Issued in U.S. Appl. No. 16/403,271", dated Apr. 6, 2021, 28 Pages.
"Non Final Office Action Issued in U.S. Appl. No. 16/387,425", dated Mar. 25, 2021, 13 Pages.
"Final Office Action Issued in U.S. Appl. No. 16/397,765", dated Mar. 17, 2021, 22 Pages.
"Notice of Allowance Issued in U.S. Appl. No. 16/387,380", dated Jun. 3, 2021, 18 Pages.
"Notice of Allowance Issued in U.S. Appl. No. 16/387,425", dated Jul. 14, 2021, 10 Pages.
"Non Final Office Action Issued in U.S. Appl. No. 16/397,765", dated Sep. 14, 2021, 28 Pages.
"Non Final Office Action Issued in U.S. Appl. No. 16/403,271", dated Sep. 13, 2021, 7 Pages.
"Non Final Office Action Issued in U.S. Appl. No. 16/397,746", dated Aug. 5, 2021, 12 Pages.
"Notice of Allowance Issued in U.S. Appl. No. 16/387,380", dated Oct. 20, 2021, 13 Pages.

* cited by examiner

STORING AND EXECUTING AN APPLICATION IN A USER'S PERSONAL STORAGE WITH USER GRANTED PERMISSION

BACKGROUND OF THE INVENTION

Most of currently used documents or records that prove identity are issued by centralized organizations, such as governments, schools, employers, or other service centers or regulatory organizations. These organizations often maintain every member's identity in a centralized identity management system. A centralized identity management system is a centralized information system used for organizations to manage the issued identities, their authentication, authorization, roles and privileges. Centralized identity management systems have been deemed as secure since they often use professionally maintained hardware and software. Typically, the identity issuing organization sets the terms and requirements for registering people with the organization. Finally, when a party needs to verify another party's identity, the verifying party often needs to go through the centralized identity management system to obtain information verifying and/or authenticating the other party's identity.

Decentralized Identifiers (DIDs) are a new type of identifier, which are independent of any centralized registry, identity provider, or certificate authority. Distributed ledger technology (such as blockchain) provides the opportunity for using fully decentralized identifiers. Distributed ledger technology uses globally distributed ledgers to record transactions between two or more parties in a verifiable way. Once a transaction is recorded, the data in the section of ledger cannot be altered retroactively without the alteration of all subsequent sections of the ledger, which provides a fairly secure platform. In such a decentralized environment, each owner of DID generally has control over his/her own data using his/her DID.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Embodiments disclosed herein are related to computing systems, and methods for storing and executing an application in a user's personal storage with user granted permission. The computing system and methods are implemented in a decentralized network that implements a distributed edger, the distributed ledger being configured to back up one or more decentralized identifier (DID) for one or more users of the computing system. First, a request from an entity for storing an executable application in a data storage that is associated with an owner of a DID is received. Specifically, executable application is configured to use a portion of personal data stored in the data storage as one or more input to generate one or more results. Next, one or more characteristics of the application associated with the entity is identified. Based on the identified one or more characteristics, the system determines the executable application is allowed to be stored in the data storage. Then, a write permission is granted to the entity to write the executable application in the data storage, and the executable application is stored in the portion of the data storage. Thereafter, the system may allow or deny an execution of the application using the portion of data stored in the storage.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

Embodiments disclosed herein are related to computing systems, and methods for storing and executing an application in a user's personal storage with user granted permission. The computing system and methods are implemented in a decentralized network that implements a distributed edger, the distributed ledger being configured to back up one or more decentralized identifier (DID) for one or more users of the computing system. First, a request from an entity for storing an executable application in a data storage that is associated with an owner of a DID is received. Specifically, executable application is configured to use a portion of personal data stored in the data storage as one or more input to generate one or more results. Next, one or more characteristics of the application associated with the entity is identified. Based on the identified one or more characteristics, the system determines the executable application is allowed to be stored in the data storage. Then, a write permission is granted to the entity to write the executable application in the data storage, and the executable application is stored in the portion of the data storage. Thereafter, the system may allow or deny an execution of the application using the portion of data stored in the storage.

The principles described herein provide a technical advance to give a user complete control over his/her personal data, while still allow third-party applications to use the user's personal data to generate the results that the user needs Because the principles described herein may be performed in the context of a computing system, some introductory discussion of a computing system will be described with respect to FIG. 1. Then, this description will return to the principles of the DID platform with respect to the remaining figures.

Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 1:
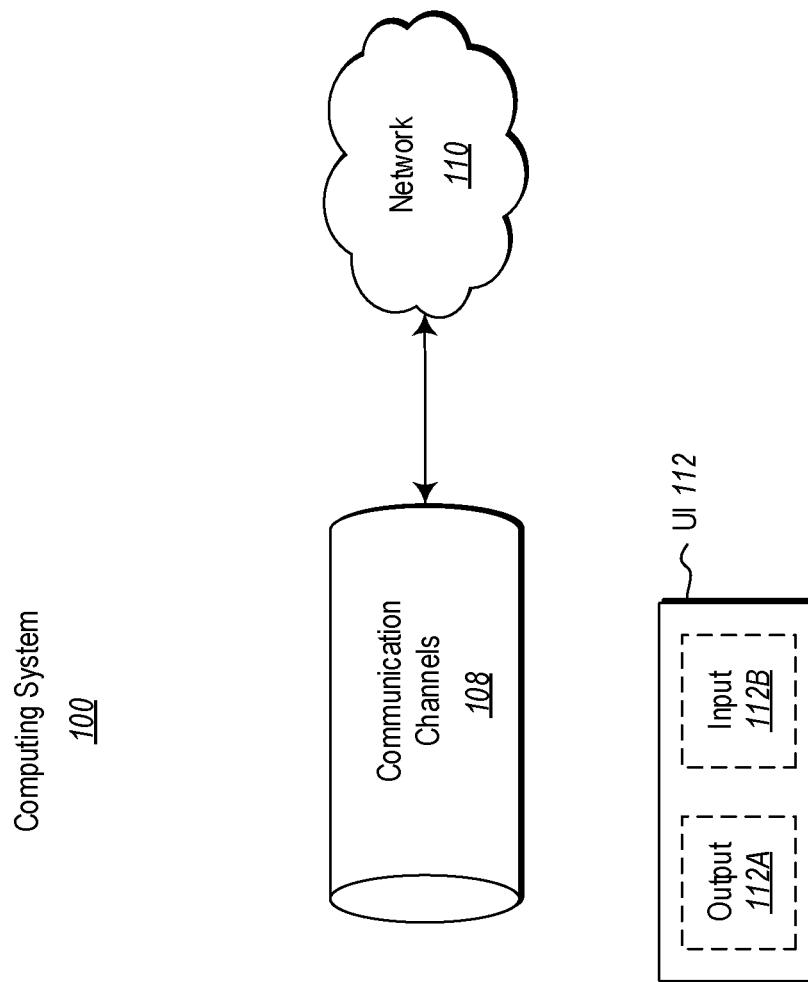
FIG. 1 illustrates an example computing system in which the principles described herein may be employed.

As illustrated in FIG. 1, in its most basic configuration, a computing system 100 typically includes at least one hardware processing unit 102 and memory 104. The processing unit 102 may include a general purpose processor and may also include a field programmable gate array (FPGA), an application specific integrated circuit (ASIC), or any other specialized circuit. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 100 also has thereon multiple structures often referred to as an "executable component". For instance, the memory 104 of the computing system 100 is illustrated as including executable component 106. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods, and so forth, that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard coded or hard wired logic gates. The computer-executable instructions (and the manipulated data) may be stored in the memory 104 of the computing system 100. Computing system 100 may also contain communication channels 108 that allow the computing system 100 to communicate with other computing systems over, for example, network 110.

While not all computing systems require a user interface, in some embodiments, the computing system 100 includes a user interface system 112 for use in interfacing with a user. The user interface system 112 may include output mechanisms 112A as well as input mechanisms 112B. The principles described herein are not limited to the precise output mechanisms 112A or input mechanisms 112B as such will depend on the nature of the device. However, output mechanisms 112A might include, for instance, speakers, displays, tactile output, holograms and so forth. Examples of input mechanisms 112B might include, for instance, microphones, touchscreens, holograms, cameras, keyboards, mouse of other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

The remaining figures may discuss various computing system which may correspond to the computing system 100 previously described. The computing systems of the remaining figures include various components or functional blocks that may implement the various embodiments disclosed herein as will be explained. The various components or functional blocks may be implemented on a local computing system or may be implemented on a distributed computing system that includes elements resident in the cloud or that implement aspects of cloud computing. The various components or functional blocks may be implemented as software, hardware, or a combination of software and hardware. The computing systems of the remaining figures may include more or less than the components illustrated in the figures and some of the components may be combined as circumstances warrant. Although not necessarily illustrated, the various components of the computing systems may access and/or utilize a processor and memory, such as processor 102 and memory 104, as needed to perform their various functions.

Figure 2:
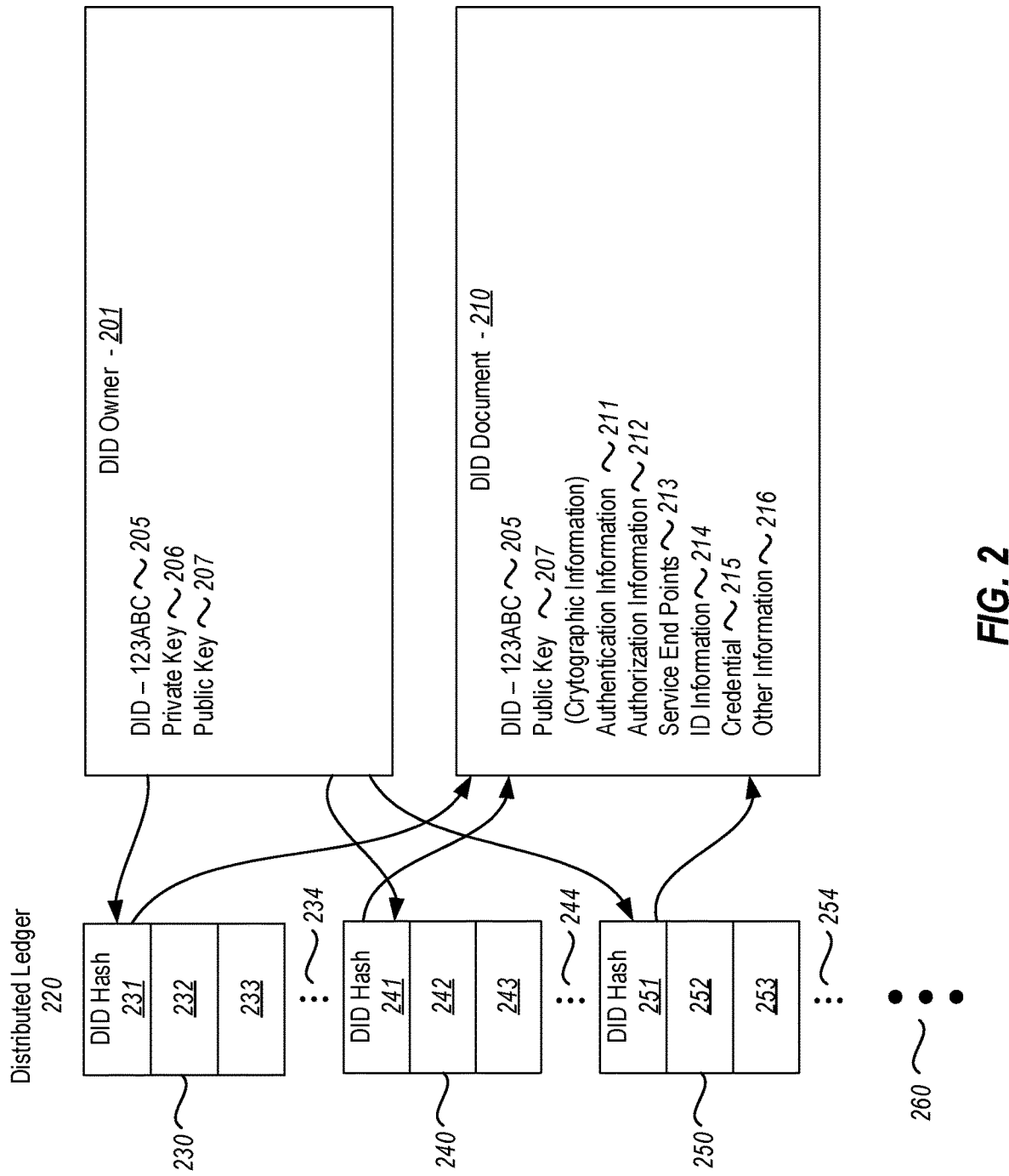
FIG. 2 illustrates an example environment for creating a decentralized identification or identifier (DID)

Some introductory discussion of a decentralized identification (DID) and the environment is which they are created and reside will not be given with respect to FIG. 2. As illustrated in FIG. 2, a DID owner 201 may own or control a DID 205 that represents an identity of the DID owner 201. The DID owner 201 may register a DID using a creation and registration service, which will be explained in more detail below.

The DID owner 201 may be any entity that could benefit from a DID. For example, the DID owner 201 may be a human being or an organization of human beings. Such organizations might include a company, department, government, agency, or any other organization or group of organization. Each individual human being might have a DID while the organization(s) to which each belongs might likewise have a DID.

The DID owner 201 may alternatively be a machine, system, or device, or a collection of machine(s), device(s) and/or system(s). In still other embodiments, the DID owner 201 may be a subpart of a machine, system or device. For instance, a device could be a printed circuit board, where the subpart of that circuit board are individual components of the circuit board. In such embodiments, the machine or device may have a DID and each subpart may also have a DID. A DID owner might also be a software component such as the executable component 106 described above with respect to FIG. 1. An example of a complex executable component 106 might be an artificial intelligence. An artificial intelligence may also own a DID.

Thus, the DID owner 201 may be any reasonable entity, human or non-human, that is capable of creating the DID 205 or at least having the DID 205 created for and associated with them. Although the DID owner 201 is shown as having a single DID 205, this need not be the case as there may be any number of DIDs associated with the DID owner 201 as circumstances warrant.

As mentioned, the DID owner 201 may create and register the DID 205. The DID 205 may be any identifier that may be associated with the DID owner 201. Preferably, that identifier is unique to that DID owner 201, at least within a scope in which the DID is anticipated to be in use. As an example, the identifier may be a locally unique identifier, and perhaps more desirably a globally unique identifier for identity systems anticipated to operate globally. In some embodiments, the DID 205 may be a Uniform Resource identifier (URI) (such as a Uniform Resource Locator (URL)) or other pointer that relates the DID owner 201 to mechanism to engage in trustable interactions with the DID owner 201.

The DID 205 is "decentralized" because it does not require a centralized, third party management system for generation, management, or use. Accordingly, the DID 205 remains under the control of the DID owner 201. This is different from conventional centralized IDs based trust on centralized authorities and that remain under control of the corporate directory services, certificate authorities, domain name registries, or other centralized authority (referred to collectively as "centralized authorities" herein). Accordingly, the DID 205 may be any identifier that is under the control of the DID owner 201 and independent of any centralize authority.

In some embodiments, the structure of the DID 205 may be as simple as a user name or some other human understandable term. However, in other embodiments, the DID 205 may preferably be a random string of number and letters for increased security. In one embodiment, the DID 205 may be a string of 128 letters and numbers. Accordingly, the embodiments disclosed herein are not dependent on any specific implementation of the DID 205. In a very simple example, the DID 205 is shown as "123ABC".

As also shown in FIG. 2, the DID owner 201 has control of a private key 206 and public key 207 pair that are associated with the DID 20. Because the DID 205 is independent of any centralized authority, the private key 206 should at all times be fully in control of the DID owner 201. That is, the private and public keys should be generated in a decentralized manner that ensures that they remain under the control of the DID owner 201.

As will be described in more detail to follow, the private key 206 and public key 207 pair may be generated on a device controlled by the DID owner 201. The private key 206 and public key 207 pair should not be generated on a server controlled by any centralized authority as this may cause the private key 206 and public key 207 pair to not be fully under the control of the DID owner 201 at all times. Although FIG. 2 and this description have described a private and public key pair, it will also be noted that other types of reasonable cryptographic information and/or mechanism may also be used as circumstances warrant.

FIG. 2 also illustrates a DID document 210 that is associated with the DID 205. As will be explained in more detail to follow, the DID document 210 may be generated at the time that the DID 205 is created. In its simplest form, the DID document 210 describes how to use the DID 205. Accordingly, the DID document 210 includes a reference to the DID 205, which is the DID that is described by the DID document 210. In some embodiments, the DID document 210 may be implemented according to methods specified by a distributed ledger 220 that will be used to store a representation of the DID 205 as will be explained in more detail to follow. Thus, the DID document 210 may have different methods depending of the specific distributed ledger.

The DID document 210 also includes the public key 207 created by the DID owner 201 or some other equivalent cryptographic information. The public key 207 may be used by third party entities that are given permission by the DID owner 201 to access information and data owned by the DID owner 201. The public key 207 may also be used by verify that the DID owner 201 in fact owns or controls the DID 205.

The DID document 210 may also include authentication information 211. The authentication information 211 may specify one or more mechanisms by which the DID owner 201 is able to prove that the DID owner 201 owns the DID 205. In other words, the mechanisms of authentication information 211 may show proof of a binding between the DID 205 (and thus it's DID owner 201) and the DID document 210. In one embodiment, the authentication information 211 may specify that the public key 207 be used in a signature operation to prove the ownership of the DID 205. Alternatively or in addition, the authentication information 211 may specify that the public key 207 be used in a biometric operation to prove ownership of the DID 205. Accordingly, the authentication information 211 may include any number of mechanisms by which the DID owner 201 is able to prove that the DID owner 201 owns the DID 205.

The DID document 210 may also include authorization information 212. The authorization information 212 may allow the DID owner 201 to authorize third party entities the rights to modify the DID document 210 or some part of the document without giving the third party the right to prove ownership of the DID 205. For example, the authorization information 212 may allow the third party to update any designated set of one or more fields in the DID document 210 using any designated update mechanism. Alternatively, the authorization information may allow the third party to limit the usages of DID 205 by the DID owner 201 for a specified time period. This may be useful when the DID owner 201 is a minor child and the third party is a parent or guardian of the child. The authorization information 212 may allow the parent or guardian to limit use of the DID 201 until such time as the child is no longer a minor.

The authorization information 212 may also specify one or more mechanisms that the third party will need to follow to prove they are authorized to modify the DID document 210. In some embodiments, these mechanism may be similar to those discussed previously with respect to the authentication information 211.

The DID document 210 may also include one or more service endpoints 213. A service endpoint may include a network address at which a service operates on behalf of the DID owner 201. Examples of specific services include discovery services, social networks, file storage services such as identity servers or hubs, and verifiable claim repository services. Accordingly, the service endpoints 213 operate as pointers for the services that operate on behalf of the DID owner 201. These pointers may be used by the DID owner 201 or by third party entities to access the services that operate on behalf of the DID owner 201. Specific examples of service endpoints 213 will be explained in more detail to follow.

The ID document 210 may further include identification information 214. The identification information 214 may include personally identifiable information such as the name, address, occupation, family members, age, hobbies, interests, or the like of DID owner 201. Accordingly, the identification information 214 listed in the DID document 210 may represent a different persona of the DID owner 201 for different purposes. For instance, a persona may be pseudo anonymous, e.g., the DID owner 201 may include a pen name in the DID document when identifying him or her as a writer posting articles on a blog; a persona may be fully anonymous, e.g., the DID owner 201 may only want to disclose his or her job title or other background data (e.g., a school teacher, an FBI agent, an adult older than 21 years old, etc.) but not his or her name in the DID document; and a persona may be specific to who the DID owner 201 is as an individual, e.g., the DID owner 201 may include information identifying him or her as a volunteer for a particular charity organization, an employee of a particular corporation, an award winner of a particular award, etc.

The DID document 210 may also include credential information 215, which may also be referred to herein as an attestation. The credential information 215 may be any information that is associated with the DID owner 201's background. For instance, the credential information 215 may be (but not limited to) a qualification, an achievement, a government ID, a government right such as a passport or a driver's license, a payment provider or bank account, a university degree or other educational history, employment status and history, or any other information about the DID owner 201's background.

The DID document 210 may also include various other information 216. In some embodiments, the other information 216 may include metadata specifying when the DID document 210 was created and/or when it was last modified. In other embodiments, the other information 216 may include cryptographic proofs of the integrity of the DID document 210. In still further embodiments, the other information 216 may include additional information that is either specified by the specific method implementing the DID document or desired by the DID owner 201.

FIG. 2 also illustrates a distributed ledger or blockchain 220. The distributed ledger 220 may be any decentralized, distributed network that includes various computing systems that are in communication with each other. For example, the distributed ledger 220 may include a first distributed computing system 230, a second distributed computing system 240, a third distributed computing system 250, and any number of additional distributed computing systems as illustrated by the ellipses 260. The distributed ledger or blockchain 220 may operate according to any known standards or methods for distributed ledgers. Examples of conventional distributed ledgers that may correspond to the distributed ledger or blockchain 220 include, but are not limited to, Bitcoin [BTC], Ethereum, and Litecoin.

In the context of DID 205, the distributed ledger or blockchain 220 is used to store a representation of the DID 205 that points to the DID document 210. In some embodiments, the DID document 210 may be stored on the actual distributed ledger. Alternatively, in other embodiments the DID document 210 may be stored in a data storage (not illustrated) that is associated with the distributed ledger or blockchain 220.

As mentioned, a representation of the DID 205 is stored on each distributed computing system of the distributed ledger or blockchain 220. For example, in FIG. 2 this is shown as the DID has 231, DID has 241, and DID has 251, which are ideally identical copies of the same DID. The DID hash 231, DID has 241, and DID hash 251 may then point to the location of the DID document 210. The distributed ledger or blockchain 220 may also store numerous other representations of other DIDs as illustrated by references 232, 233, 234, 242, 243, 244, 252, 253, and 254.

In one embodiment, when the DID user 201 creates the DID 205 and the associated DID document 210, the DID has 231, DID has 241, and DID hash 251 are written to the distributed ledger or blockchain 220. The distributed ledger or blockchain 220 thus records that the DID 205 now exists. Since the distributed ledger or blockchain 220 is decentralized, the DID 205 is not under the control of any entity outside of the DID owner 201. The DID hash 231, DID has 241, and DID has 251 may include, in addition to the pointer to the DID document 210, a record or time stamp that specifies when the DID 205 was created. At a later date when modifications are made to the DID document 210, this may also be recorded in DID has 231, DID has 241, and DID has 251. The DID has 231, DID has 241, and DID hash 251 may further include a copy of the public key 207 so that the DID 205 is cryptographically bound to the DID document 210.

Figure 3:
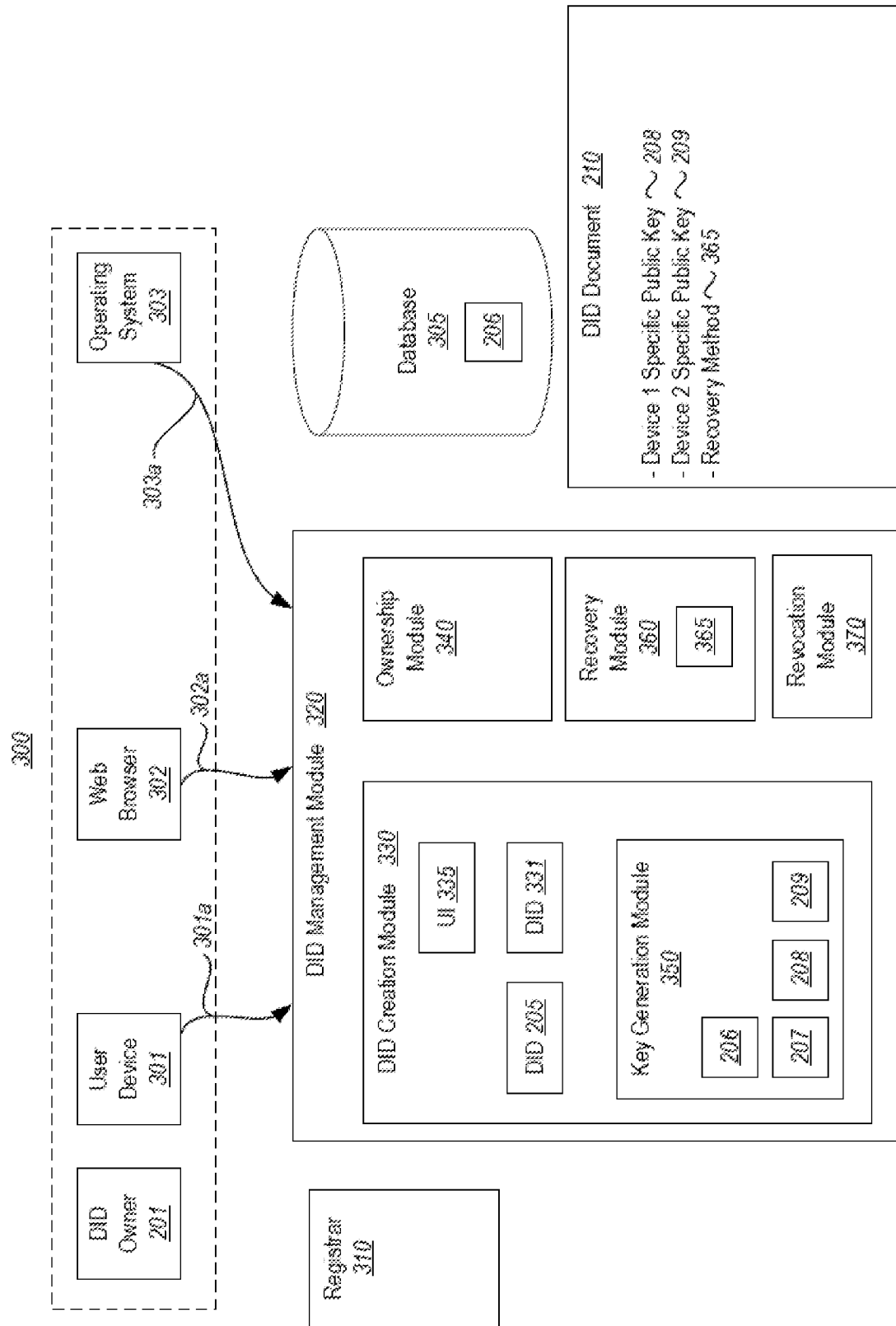
FIG. 3 illustrates an example environment for various DID management operations and services.

Having described DIDs and how they operate generally with reference to FIG. 2, specific embodiments of DIDs will now be explained. Turning to FIG. 3, an environment 300 that may be used to perform various DID lifecycle management operations and services will now be explained. It will be appreciated that the environment of FIG. 3 may reference elements from FIG. 2 as needed for ease of explanation.

As shown in FIG. 3, the environment 300 may include various devices and computing systems that may be owned or otherwise under the control of the DID owner 21. These may include a user device 301. The user device 301 may be, but is not limited to, a mobile device such as a smart phone, a computing device such as a laptop computer, or any device such as a car or an appliance that includes computing abilities. The device 301 may include a web browser 302 operating on the device and an operating system 303 operating the device. More broadly speaking, the dashed line 304 represents that all of these devices may be owned or otherwise under the control of the DID owner 201.

The environment 300 also includes a DID lifestyle management module 320. It will be noted that in operation, the DID lifecycle management module 320 may reside on and be executed by one or more of user device 301, web browser 302, and the operating system 303 as illustrated by the lines 301a, 302a, and 303a. Accordingly, DID lifecycle management module 320 is shown as being separate for ease of explanation.

As shown in FIG. 3, the DID lifecycle management module 320 includes a DID creation module 330. The DID creation module 330 may be used by the DID owner 201 to create the DID 205 or any number of additional DIDs, such as DID 331. In one embodiment, the DID creation module may include or otherwise have access to a User Interface (UI) element 335 that may guide the DID owner 201 in creating the DID 205. The DID creation module 330 may have one or more drivers that are configured to work with specific distributed ledgers such as distributed ledger 220 so that the DID 205 complies with the underlying methods of that distributed ledger.

A specific embodiment will now be described. For example, the UI 335 may provide a prompt for the user to enter a user name or some other human recognizable name. This name may be used as a display name for the DID 205 that will be generated. As previously described, the DID 205 may be a long string of random numbers and letters and so having a human recognizable name for a display name be advantageous. The DID creation module 330 may then generate the DID 205. In the embodiments having the UI 335, the DID 205 may be shown in a listing of identities and may be associated with the human recognizable name.

The DID creation module may also include a key generation module 350. The key generation module may generate the private key 206 and public key 207 pair previously described. The DID creation module 330 may then use the DID 205 and the private and public key pair to generate the DID document 210.

In operation, the DID creation module 330 accesses a registrar 310 that is configured to the specific distributed ledger that will be recording the transactions related to the DID 205. The DID creation module 330 uses the registrar 310 to record the DID hash 231, DID hash 241, and DID hash 251 in the distributed ledger in the manner previously described and to store the DID document 210 in the manner previously described. This process may use the public key 207 in the has generation.

In some embodiments, the DID lifecycle management module 320 may include an ownership module 340. The ownership module 340 may provide mechanisms that ensure that the DID owner 201 is aware that the DID owner 201 is in sole control of the DID 205. In this way, the provider of the DID lifecycle management module 320 is able to ensure that the provider does not control the DID 205, but is only providing the management services.

As previously discussed, the key generation module 350 generates the private key 206 and public key 207 pair and the public key 207 is then recorded in the DID document 210. Accordingly, the public key 207 may be used by all devices associated with the DID owner 201 and all third parties that desire to provide services to the DID owner 201. Accordingly, when the DID owner 201 desires to associate a new device with the DID 205, the DID owner 201 may execute the DID creation module 330 on the new device. The DID creation module 330 may then use the registrar 310 to update the DID document 210 to reflect that the new device is now associated with the DID 205 and this would be reflected in an updated transaction on the distributed ledger 220 as previously described.

In some embodiments, however, it may be advantageous to have a public key per device 301 owned by the DID owner 201 as this may allow the DID owner 201 to sign with the specific device public key without having to access a general public key. In other words, since the DID owner 201 will use different devices at different times (for example using a mobile phone in one instance and then using a laptop computer in another instance) it is advantageous to have a key associated with each device to provide efficiencies in signing using the keys. Accordingly, in such embodiments the key generation module may generate additional public keys 208 and 209 when the additional devices execute the DID creation module 330. These additional public keys may be associated with private key 206 or in some instances may be paired with a new private key.

In those embodiments where the additional public keys 208 and 209 are associated with different devices, the additional public keys 208 and 209 may be recorded in the DID document 210 as being associated with those devices. This is shown in FIG. 3. It will be appreciated that the DID documents 210 may include the information previously described in relation to FIG. 2 in addition to the information shown in FIG. 3. If the DID document 210 existed prior to the device specific public keys being generated, then the DID document 210 would be updated by the creation module 330 via the registrar 310 and this would be reflected in an updated transaction on the distributed ledger 220.

In some embodiments, the DID owner 201 may desire to keep the association of a device with a public key or even with the DID 205 a secret. Accordingly, the DID creation module 330 may cause that such data be secretly shown in the DID document 210.

As described thus far, the DID 205 has been associated with all the devices under the control of the DID owner 201, even when the devices have their own public keys. However, in some embodiments it may be useful for each device or some subset of devices under the control of the DID owner 201 to each have their own DID. Thus, in some embodiments the DID creation module 330 may generate an additional DID, for example DID 331, for each device. The creation module would then generate private and public key pairs and DID documents for each of the devices and have them recorded on the distributed ledger 220 in the manner previously described. Such embodiments may be advantageous for devices that may change ownership as it may be possible to associate the specific device DID to the new owner of the device by granting the new owner authorization rights in the DID document and revoking such rights from the old owner.

As mentioned, the private key, to ensure that it is totally in the control of the DID owner 201, is created on the user device 301, browser 302, or operating system 303 owned or controlled by the DID owner 201 that executed the DID management module 320. In this way, there is little chance that a third party may gain control of the private key 206, especially the provider of the DID lifecycle management module 320. However, there is a chance that the device storing the private key 206 may be lost by the DID owner 201, which may cause the DID owner 201 to lose access to the DID 205. Accordingly, in some embodiments the UI 335 may include the option to allow the DID owner 201 to export the private key 206 to an off device secured database 305 that is under the control of the DID owner 201. In some embodiments, the private key 206 may be stored as a QR code that may scanned by the DID owner 201.

In other embodiments, the DID lifecycle management module 320 may include a recovery module 360 that may be used to recover a lost private key 206. In operation, the recovery module 360 allows the DID owner 201 to select one or more recovery mechanisms 365 at the time the DID 205 is created that may later be used to recover the lost private key. In those embodiments having the UI 335, the UI 335 may allow the DID owner 201 to provide required information that will be needed by the one or more recovery mechanisms 365 when the recovery mechanisms are implemented. The recovery module may then be run on any device associated with the DID 205.

The DID lifecycle management module 320 may also include a revocation module 370 that is used to revoke or sever a device from the DID 205. In operation, the revocation module may use the UI element 335, which may allow the DID owner 201 to indicate a desire to remove a device from being associated with the DID 205. In one embodiment, the revocation module may access the DID document 210 and may cause that all references to the device be removed from the DID document. Alternatively, the public key for the device may be removed. This change in the DID document 210 may then be reflected as an updated transaction on the distributed ledger 220 as previously described.

Figure 4:
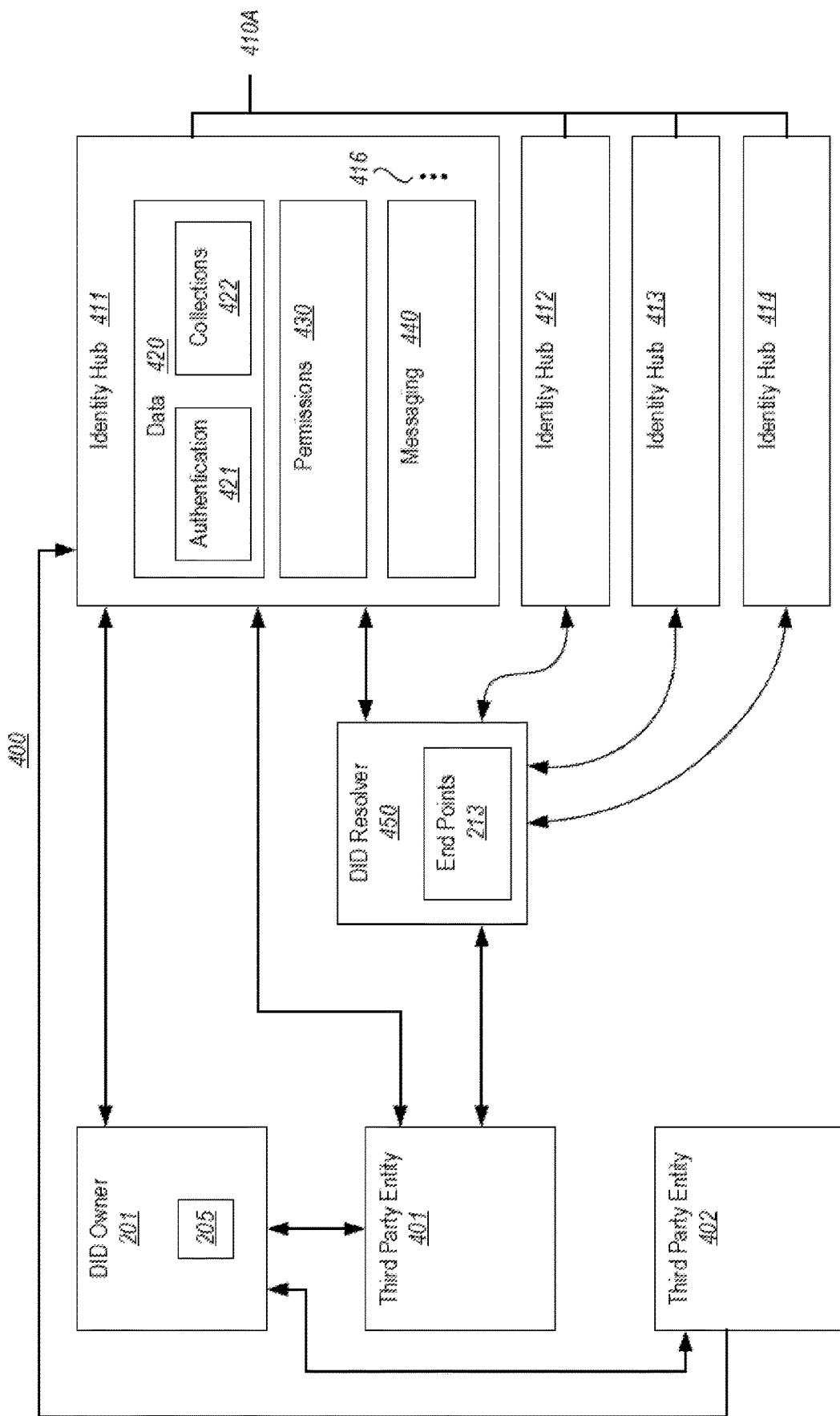
FIG. 4 illustrates an example decentralized storage device or identity hub.

FIG. 4 illustrates an embodiment of an environment 400 in which a DID such as DID 205 may be utilized. Specifically, the environment 400 will be used to describe the use of the DID 205 in relation to one or more decentralized storage devices or identity hubs. It will be noted that FIG. 4 may include references to elements first discussed in relation to FIG. 2 or 3 and thus use the same reference numeral for ease of explanation.

In one embodiment, the identity hubs 410 may be multiple instances of the same identity hub. This is represented by the line 410A. Thus, the various identity hubs 410 may include at least some of the same data and services. Accordingly, if any change is made to one of the identity hubs 410, the change may be reflected in the remaining identity hubs. For example, the first identity hub 411 and second identity hub 412 are implemented in cloud storage and thus may be able to hold a large amount of data. Accordingly, a full set of the data may be stored in these identity hubs. However, the identity hubs 412 and 413 may have less memory space. Accordingly, in these identity hubs a descriptor of the data stored in the first and second identity hubs may be included. Alternatively, a record of changes made to the data in other identity hubs may be included. Thus, changes in one of the identity hubs 410 are either fully replicated in the other identity hubs or at least a record or descriptor of that data is recorded in the other identity hubs.

Because the identity hubs may be multiple instances of the same identity hub, only a full description of the first identity hub 411 will provided as this description may also apply to the identity hubs 412-415. As illustrated, identity hub 411 may include data storage 420. The data storage 420 may be used to store any type of data that is associated with the DID owner 201. In one embodiment the data may be a collection 422 of a specific type of data corresponding to a specific protocol. For example, the collection 422 may be medical records data that corresponds to a specific protocol for medical data. The collection 422 may be any other type of data.

In one embodiment, the stored data may have different authentication and privacy settings 421 associated with the stored data. For example, a first subset of the data may have a setting 421 that allows the data to be publically exposed, but that does not include any authentication to the DID owner 201. This type of data may be for relatively unimportant data such as color schemes and the like. A second subset of the data may have a setting 421 that that allows the data to be publically exposed and that includes authentication to the DID owner 201. A third subset of the data may have a setting 421 that encrypts the subset of data with the private key 206 and public key 207 pair (or some other key pair) associated with the DID owner 201. This type of data will require a party to have access to the public key 207 or to some other associated public key in order to decrypt the data. This process may also include authentication to the DID owner 201. A fourth subset of the data may have a setting 421 that restricts this data to a subset of third parties. This may require that public keys associated with the subset of third parties be used to decrypt the data. For example, the DID owner 201 may cause the setting 421 to specify that only public keys associated with friends of the DID owner 201 may decrypt this data.

In some embodiments, the identity hub 411 may have a permissions module 430 that allows the DID owner 201 to set specific authorization or permissions for third parties such as third parties 401 and 402 to access the identity hub. For example, the DID owner 201 may provide access permission to his or her spouse to all the data 420. Alternatively, the DID owner 201 may allow access to his or her doctor for any medical records. It will be appreciated that the DID owner 201 may permission to any number of third parties to access a subset of the data 420. This will be explained in more detail to follow.

The identity hub 411 may also have a messaging module 440. In operation, the messaging module allows the identity hub to receive messages such as requests from parties such as third parties 401 and 402 to access the data and services of the identity hub. In addition, the messaging module 440 allows the identity hub 411 to respond to the messages from the third parties and to also communicate with a DID resolver 450. This will be explained in more detail to follow. The ellipses 416 represent that the identity hub 411 may have additional services as circumstances warrant.

In one embodiment, the DID owner 201 may wish to authenticate a new device 301 with the identity hub 411 that is already associated with the DID 205 in the manner previously described. Accordingly, the DID owner 201 may utilize the DID management module 320 associated with the new user device 301 to send a message to the identity hub 411 asserting that the new user device is associated with the DID 205 of the DID owner 201.

However, the identity hub 411 may not initially recognize the new device as being owned by the DID owner 201. Accordingly, the identity hub 411 may use the messaging module 440 to contact the DID resolver 450. The message sent to the DID resolver 450 may include the DID 205.

The DID resolver 450 may be a service, application, or module that is configured in operation to search the distributed ledger 220 for DID documents associated with DIDs. Accordingly, in the embodiment the DID resolver 450 may search the distributed ledger 220 using the DID 205, which may result in the DID resolver 450 finding the DID document 210. The DID document 210 may then be provided to the identity hub 411.

As discussed previously, the DID document 210 may include a public key 208 or 209 that is associated with the new user device 301. To verify that the new user device is owned by the DID owner 201, the identity hub 411 may provide a cryptographic challenge to the new user device 301 using the messaging module 440. This cryptographic challenge will be structured such that only a device having access to the private key 206 will be able to successfully answer the challenge In the embodiment, since the new user device is owned by DID owner 201 and thus has access to the private key 206, the challenge may be successfully answered. The identity hub 411 may then record in the permissions 430 that the new user device 301 is able to access the data and services of the identity hub 411 and also the rest of the identity hubs 210.

It will be noted that this process of authenticating the new user device 301 was performed without the need for the DID owner 201 to provide any username, password or the like to the provider of the identity hub 411 (i.e., the first cloud storage provider) before the identity hub 411 could be accessed. Rather, the access was determined in a decentralized manner based on the DID 205, the DID document 210, and the associated public and private keys. Since these were at all times in the control of the DID owner 201, the provider of the identity hub 411 was not involved and thus has no knowledge of the transaction or of any personal information of the DID owner 201.

In another example embodiment, the DID owner 201 may provide the DID 205 to the third party entity 401 so that the third party may access data or services stored on the identity hub 411. For example, the DID owner 201 may be a human who is at a scientific conference who desires to allow the third party 401, who is also a human, access to his or her research data. Accordingly, the DID owner 201 may provide the DID 205 to the third party 401.

Once the third party 401 has access to the DID 205, he or she may access the DID resolver 450 to access the DID document 210. As previously discussed, the DID document 210 may include an end point 213 that is an address or pointer to the identity hub 411. The third party 401 may then use the address or pointer to access the identity hub 411.

The third party 401 may send a message to the messaging module 440 asking for permission to access the research data. The messaging module 440 may then send a message to the DID owner 201 asking if the third party 401 should be given access to the research data. Because the DID owner desires to provide access to this data, the DID owner 201 may allow permission to the third party 401 and this permission may be recorded in the permissions 430.

The messaging module 440 may then message the third party 401 informing the third party that he or she is able to access the research data. The identity hub 411 and the third party 401 may then directly communicate so that the third party may access the data. It will be noted that in many cases, it will actually be an identity hub associated with the third party 401 that communicates with the identity hub 411. However, it may a device of the third party 401 that does the communication.

Advantageously, the above described process allows the identity hub 411 and the third party 401 to communicate and to share the data without the need for the third party to access the identity hub 411 in the conventional manner. Rather, the communication is provisioned in the decentralized manner using the DID 205 and the DID document 210. This advantageously allows the DID owner to be in full control of the process.

As shown in FIG. 4, the third party 402 may also request permission for access to the identity hub 411 using the DID 205 and the DID document 210. Accordingly, the embodiments disclosed herein allow access to any number of third parties to the identity hubs 210.

Figure 5:
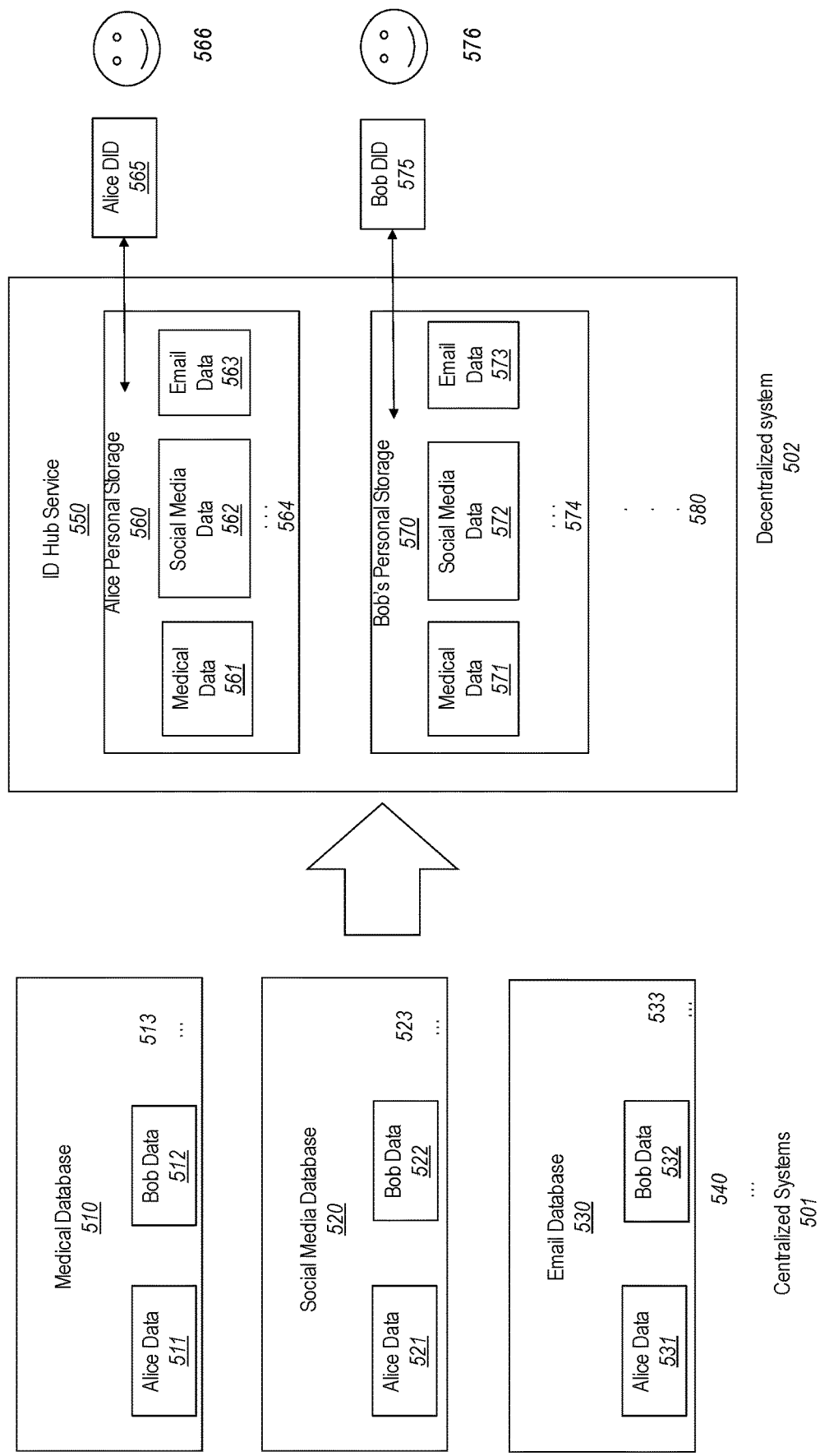
FIG. 5 illustrates an overview comparison between a centralized data system and a decentralized data system.

Having described an example environment for creating a DID and an example environment for various DID lifecycle management operations and services, we will make a simplified comparison between a "centralized" data system and a "decentralized" data system (that implements DIDs) with respect to FIG. 5.

The left side of FIG. 5 illustrates one or more centralized data systems 501. A "centralized data system" referred herein is a database or data system that is stored and maintained by a centralized organization. The database or data system may be located in a single location as a true "centralized" data system, or it may be a distributed database that includes multiple database files located in different locations. However, no matter whether the data system is located in a single location or multiple locations, as long as the data system is stored and maintained by a centralized organization, such a data system is herein referred to as "centralized data system."

Most of the existing data systems are centralized. For example, as illustrated in FIG. 5, the medical database 510 is an example centralized database. The medical database 510 may be stored and maintained by a hospital, a clinic office, and/or a data service provider. The medical database 510 includes Alice's data 511 and Bob's data 512. The ellipsis 513 represents that there may be records of any number of patients being stored in the medical database 510. Currently, even though the laws may require health service providers to make medical data be available to the respective patient, each patient normally does not have constant access to his/her own medical data. A patient usually needs to submit a written request or request in person, if he/she wants to review his/her complete medical history.

Additionally, the social media database 520 and the email database 530 are also examples of centralized data systems. For instance, the social media company (e.g., Facebook) maintains its own database 520 that may include each of the users' personal information, the corresponding user generated contents, communications between the corresponding user and other users, etc. As illustrated in FIG. 5, the social media database 520 may include a record of Alice (i.e., Alice data 521) and a record of Bob (i.e., Bob data 522). The record of Alice 521 may include Alice's personal information that she entered in the settings, her friends' IDs, the message Alice has posted, the ads Alice has clicked, etc. Similarly, the record of Bob 522 may include similar types of information that is associated with Bob's social media account. The ellipsis 523 represents that there may be any number of user records stored in the social media database 520 that is controlled and maintained by the social media service provider. Even though in this case each of the social media account holders generally has access to his/her own account information, the social media service provider has real control over all the data. For example, if the social media service provider's server is down or the hard drive is crashed, the users may lose connection or even lose their data. Another example, if the social media service's server is hacked, the users' information may be lost even without the users' knowledge.

Also similarly, the email database 530 is another example of a centralized data system. The email database 530 is controlled and maintained by the email service provider (e.g., outlook.com, gmail.com, etc.). Most of the existing service providers maintain its own email server, and each user must register an account with the email server to obtain an email account. Once an email account is registered, it is stored on the server that is maintained by the service provider. For example, as illustrated in FIG. 5, the email database 530 hosted by an email server may include Alice's email account data 531 and Bob's email account data 532. The ellipsis 533 represents that there may be any number of email account records stored in the email database 530. Alice's email account data 531 may include her personal information she entered when registering the email account. Alice's email data 531 may also include all the emails she received and sent using the email account. Similarly, Bob's email account data 432 may include similar information related to Bob's email account. If the email server is down, the users would not be able to receive or send emails, and also not able to retrieve his/her email history unless a local copy is stored on the user's own device. The email server may also be vulnerable to cyber-attacks. When such an attack occurs, users also often do not aware that their information has been compromised.

The right side of FIG. 5 illustrates a simplified decentralized system 502 that provides a personal storage for each DID owner in an ID hub service 550. The personal storage in the ID hub service 550 is controlled by the DID owner, instead of the centralized organization. For example, as illustrated in FIG. 5, the ID Hub Service 550 includes Alice's personal storage 560 and Bob's personal storage 570. The ellipsis 580 represents that there may be any number of personal storages, each of which is associated with a DID (or a DID owner).

The personal storage of Alice 560 includes Alice's medical data 561, Alice's social media data 562, and Alice's email data 563. The ellipsis 564 represents that there may be other types of Alice's personal data stored in Alice's personal storage 560 in the ID hub service 550. Similarly, Bob's personal storage 570 stores Bob's medical data 571, Bob's social media data 572, and Bob's email data 573. The ellipsis 574 represents that there may be other types of Bob's personal data stored in Bob's personal storage 570 in the ID hub service 550.

Each of Alice 566 and Bob 575 may be a DID owner 201 described in FIGS. 2-4. Each of Alice's DID 565 and Bob's DID 575 may be a DID 205 described in FIGS. 2-4. In the decentralized system 502, each DID owner has great control over his/her own personal data via his/her DID. For example, Alice 566 has control over the personal storage 560 via her DID 565; and Bob 576 has control over his personal storage 570 via his DID 575. No single centralized entity has access to all the users' information and data without each user's consent. Theoretically, as long as the user stores his/her DID (or the private key of his/her DID) securely, no one else could compromise the data stored in the ID hub. Comparing to the centralized systems 501 on the left, it is clear that unlike the centralized systems 501, where each of the centralized organizations maintains and controls every user's data, the decentralized system 502 allows each of the users (e.g., DID owners) to store and control his/her own data individually. A user (e.g., a DID owner) can decide whether the data should be made public and/or who can have access to the data; and the user can also decide whether he/she wants to delete or make any change of any portion of the data.

As described above, decentralized systems provide a fairly secure data storage for the users (e.g., DID owners). Without the private key of DID, it almost impossible for other parties to access the DID owner's data, unless the DID owner grants a permission to the other party to access the DID owner's data. The principles described herein will further allow a user (e.g., a DID owner) to specify a scope of permission that is specific to be used in the execution of a particular application or a type of applications.

In the modern world, there are many service providers that use customer's information as input to run some applications to generate one or more results for different purposes. For example, when a customer shops around for auto insurance, he/she often calls a few insurance agents and gives these insurance agents his/her personal information, and ask each of these insurance agents to generate a quote. Alternatively, the customer may go online and fill in some online forms at different insurance companies' websites, then these web applications use the user information to generate one or more quotes for the customer. Further, some of these web applications also send the user's information to several insurance agents. After the insurance agents receive this user information, they will start to contact the user continuously for a few weeks or even months. In many situations, once the customer gives such personal information out, he/she has no way to retract the information back. The information may be stored with the insurance companies' system for many years, and the customer has no control how his/her personal information may be used in the future.

The principles described herein provide user complete control over his/her personal data, while still allowing third-party applications to use the user's personal data to generate the results that the user needs. Further details of the embodiments of the systems and the methods for executing an application that stores its data in a user's personal storage with respect to FIGS. 6-10.

Figure 6:
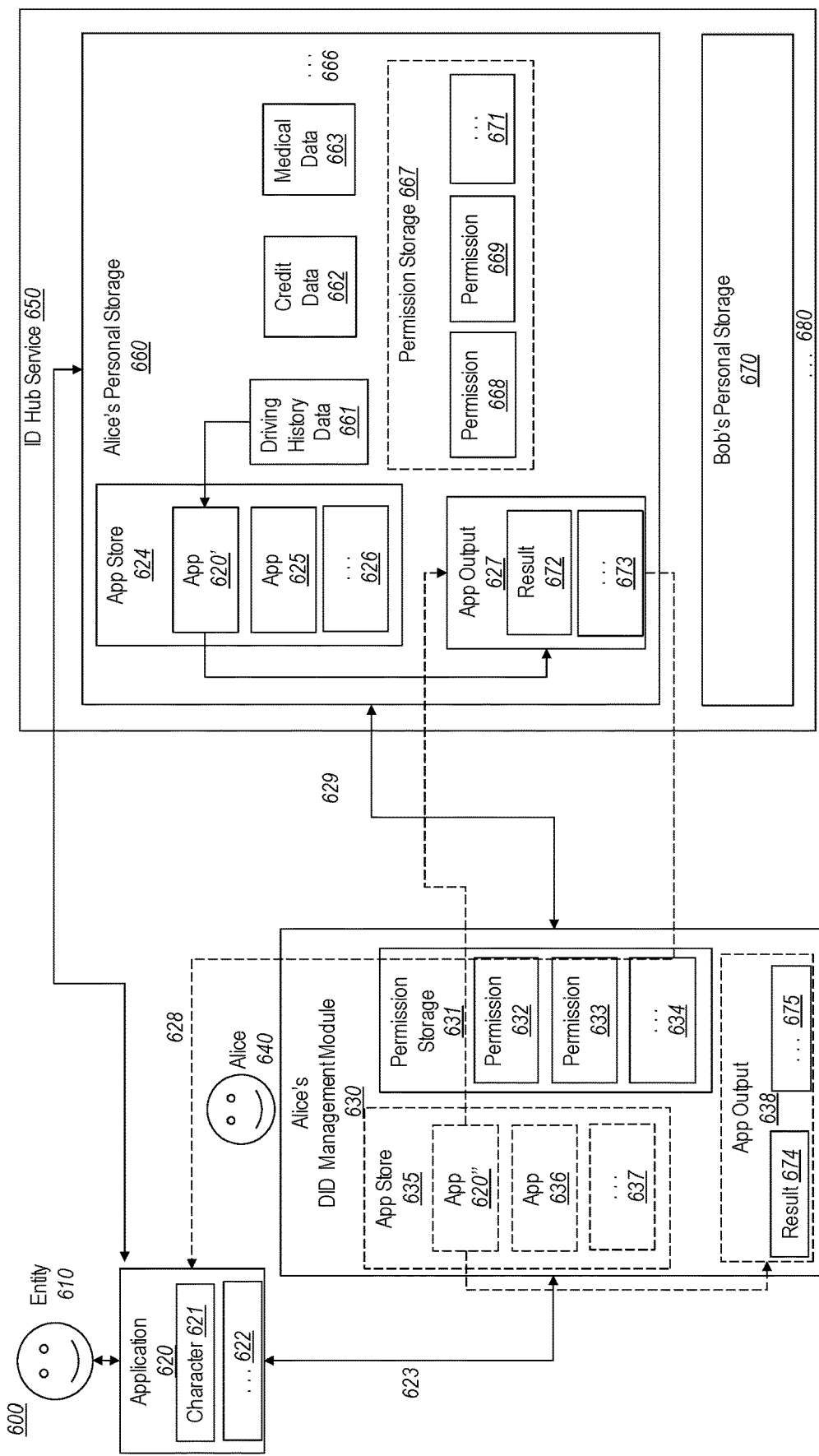
FIG. 6 illustrates an example embodiment for storing and executing an application in a user's personal storage with a user granted permission.

FIG. 6 illustrates an example embodiment 600 for storing and executing an application in a user's personal storage with a user granted permission. As illustrated in FIG. 6, Alice 640 and Bob (not shown) may be a DID owner 201 illustrated in FIGS. 2-4. Alice's personal data 661-663 is stored in Alice's personal storage 660 in the ID hub service 650. Bob's personal data (not shown) is stored in Bob's personal storage 670 in the ID hub service 650. The ID hub service 650 may be an ID Hub Service 550 of FIG. 5 or the ID hubs 410 of FIG. 4. The ID hub service 650 may be a cloud service that provides personal storages for multiple DID owners (e.g., Alice 640 and Bob). The ellipsis 680 represents that the ID hub service 650 may store any number of other DID owners' personal data. Alice's personal storage 660 may be similar to the personal storage 560 of FIG. 5; and Bob's personal storage 670 may be similar to the personal storage 570 of FIG. 5.

Alice's personal storage 660 may store many different types of personal data 661-663, such as Alice's driving history data 661, credit history data 662, medical data 663, etc. The ellipsis 666 represents that there may be other types of Alice's personal data stored in Alice's personal storage 660. Furthermore, Alice's personal storage 660 may also include a portion of storage (e.g., application storage 624) that is dedicated for storing one or more third party applications 620' and 625. The ellipsis 626 represents that there may be any number of third-party applications stored in the application storage 624. At least some of these third-party applications 620' and 625 may use some of Alice's personal data 661, 662 and 663 as one or more inputs to generate one or more results. The generated results may be sent to Alice's DID management module 630 (e.g., a mobile app), or be sent to Alice 640 in some other way (e.g., email, SMS, voice service, etc.). Alternatively, or in addition, the generated one or more results may be stored in a portion of the storage in Alice's personal storage 660 (e.g., the application output storage 627). As illustrated, the application output storage 627 may store one or more results 672 generated from the one or more applications 620' and 625 stored in the application storage 624. The ellipsis 673 represents that there may be any number of results that are stored in the application output storage 627.

Similar to the system illustrated in FIGS. 2-5, Alice 640 (who is a DID owner 201) may control her personal storage 660 (which stores her personal data 661-663, her applications 624, her application outputs 627) via a DID management module 630. The DID management module 630 may be similar to the DID management module 320 as illustrated in FIG. 3. For example, the DID management module 630 may be implemented on Alice's mobile device (e.g., a cell phone) and/or a personal computer.

In some embodiments, the DID management module 630 may also include an application storage 635 that is dedicated for storing one or more third party applications 620" and 636. The ellipsis 637 represents that there may be any number of third-party applications stored in the application storage 635. Similar to the application storage 624, at least some of the applications 620" and 636 stored in the application store 635 may use Alice's personal data 661, 662 and 663 as one or more inputs to generate one or more results. The generated results by the DID management module 630 may also be sent to Alice 640 as a notification via the DID management module 630 (e.g., a mobile app), or be sent to Alice 640 in some other way (e.g., email, SMS, voice service, etc.). Alternatively, or in addition, the generated one or more results may be stored in a portion of the storage in Alice's personal storage 660 (e.g., application output storage 627) and/or at Alice's DID management module 630 (e.g., application output storage 638). As illustrated, the application output storage 638 may be similar to the application output storage 627, and store one or more results 674 generated from the one or more applications 620", 636, 620', 625 stored in the application storages 630 and/or 624. The ellipsis 675 represents that there may be any number of results that are stored in the application output storage 638.

As an example, the entity 610 may want to provide an application 620 to Alice 640. The application 620 may need to use Alice's personal data 661, 662 and/or 663 as one or more inputs to generate one or more results. However, since Alice's personal storage 660 and her DID management module 630 are both controlled by Alice 640, Alice 640 must grant the entity 610 and/or the application 620 a write permission before the entity 610 and/or the application 620 can store or install the application 620 in Alice's personal storage 660 and/or Alice's DID management module 630.

As such, the entity 610 and/or the application 620 may first request a write permission to store the data related to the application 620 in Alice's personal storage 660 and/or Alice's management module 630. The write permission request may be sent to the ID hub service 650 and/or Alice's personal storage 660, and the ID hub service 650 and/or Alice's personal storage 660 may then notify Alice via her DID management module 630 (e.g., a mobile app), SMS, email, voice, and/or any other communication channel. The request may also be sent to Alice's DID management module in a more direction channel 623. The bi-directional arrow 628 represents the communication between the application 620 and Alice's personal storage 660, and the bi-directional arrow 623 represents the communication between the application 620 and Alice's DID management module 630.

After the request for the write permission from the entity 610 and/or the application 620 is received, a determination of whether the write permission should be granted to the entity and/or the application 620 is then made. Before the determination of whether the write permission to the entity 610 and/or the application 620 should be granted, Alice's DID management module 630, Alice's personal storage 660, and/or the ID hub service 650 may first try to identify the characteristics of the entity 610 and/or the application 620. For example, the application 620 may include one or more characteristics 621. The ellipsis 622 represents that there may be any number of characteristics related to the application 620. The one or more characteristics 621 of the application 620 may include (but are not limited to) the identity of the entity 610, purpose of the application 620, Alice 640's past interaction and/or communication with the entity 610 or a similar type of applications, etc.

Alice's personal DID management module 630, Alice's personal storage 660, and/or the ID hub service 650 may request the characteristics 621 of the application 620 from the entity 610 and/or the application 620. The entity 610 and/or the application 620 may send the one or more characteristics 621 to Alice's DID management module 630, Alice's personal storage 660, and/or the ID hub service 650. Alternatively, or in addition, the one or more characteristics 621 may also be included in the metadata of the application 620. Thus, the one or more characteristics 621 may be identified by reading the metadata of the application 620. Based on the identified one or more characteristics 621, Alice's personal storage 660 and/or DID management module 630 may then determine whether a write permission should be granted to the entity 610 and/or application 620.

Once a write permission is granted to the entity 610 or the application 620, the application 620 will be stored and/or installed as application data 620' at Alice's personal storage 660 and/or as application data 620" at Alice's DID management module 630. Since the application data 620' and/or 620" is stored in Alice's personal storage 660 and/or Alice's DID management module 630, Alice 640 may have complete control over the stored application data 620' and/or 620", and the entity 610 may no longer have control over the stored application data 620' and 620" on Alice's side. For example, Alice 640 may determine when to run the application 620' and/or 620", the scope of personal data is to be provided to the application 620' and/or 620", how to handle one or more results generated by the application 620' and/or 620" (e.g., whether the one or more results should be stored in Alice's personal storage 660 and/or her DID management module 630, and whether the one or more results may be accessed by the entity 610), whether the application 620' should be deleted at any time, etc.

For example, the entity 610 may be Alice 640's existing insurance company and the purpose of the application 620 is to generate a renew quote for Alice 640's renewal insurance policy. Alice's DID management module 630 may also be able to retrieve the entity 610's past interaction with Alice's application storage 624 and Alice's driving history data 661. Alice's DID management module 630 may also retrieve Alice's past communication history involving the entity 610. Such related records may also be deemed as one or more characteristics of the application 620 and/or the entity 610. Based on the identified characteristics 621 of the application 620 and the identity of the entity 610, Alice's DID management module 630 may automatically grant the insurance company 610 a write permission to store the application 620 in the application storage 624 of Alice's personal storage 660 and/or the application storage 635 of Alice's DID management module 630.

The write permission to allow the application 620 to be stored at Alice's personal storage 660 or her DID management module 630 and/or the scope of permission (granted to the application 620) to access Alice's personal data 631, 632, and 633 may automatically be determined by the DID management module 630 based on the identified one or more characteristics of the application 620. For example, when Alice's DID management module 630 determines that the entity 610 is Alice's current insurance company, and the application 620 is to provide Alice 640 one or more insurance renewal quotes, Alice's DID management module 630 may grant the write permission to the application 620 automatically. In addition, Alice's DID management module 630 may also grant the application 620' and/or 620" the same scope of permission to the application 620 that was granted when Alice 640 purchased her current insurance.

In some embodiments, Alice's DID management module 630 may also automatically block certain types of write requests. For example, if the entity 610 is an insurance company that Alice 640 currently does not do business with, and the insurance company wants to solicit business from Alice 640, Alice's DID management module 630 may automatically determine not to grant such an application 620 a write permission to be stored and/or installed anywhere.

Alternatively, or in addition, Alice's DID management module 630 and/or her personal storage 660 may generate a notification to let Alice 640 know that a request from the application 620 has been received and what is the nature of the application 620. The notification may be generated within Alice's DID management module 630 (e.g., a mobile app) and/or via SMS, email, and/or voice service, etc. When Alice 640 receives the notification, she may decide whether to grant the application the write permission to install itself in Alice's application storage 624 and/or 635 based on the nature of the application 620 and/or the identity of the entity 610, etc. At the same time, Alice 640 may decide a scope of permission to access the data the application 620 requires, and/or other scope of permission. Alice 640 can input via her DID management module 630 on the fly that whether the application 620 is to be granted a write permission to store the application in her personal storage 660 and/or her DID management module 630. If Alice 640 granted the application 620 the write permission, Alice 640 may further specify what scope of permission to access Alice's personal data 631, 632 and 633 is to be granted.

After a write permission to store the application 620 in Alice's application storage 624 and/or 630, the entity 610 and/or the application 620 will store and/or install the application in Alice's application storage 624 and/or 635. In particular, when the application data 620' is stored at Alice's personal storage 660, the application data 620' is secured by Alice 640's DID. Without Alice's DID, any data related to the application 620' including any intermediate result of running the application, and the one or more results generated by the application 620' should all be contained within the secured personal storage 660. In such a secured environment, the application 620' may be allowed to access all the personal data 661, 662, and 663 stored in Alice's personal storage 660. Alternatively, Alice 640 may still limit the scope of permission granted to the application 620 or anonymize certain personal data 661, 662, and 663 stored in her personal storage 660. The limited scope of permission may only allow the application 620' and/or 620" to access a portion of Alice's personal data 661, 662, and 663, access her data for a predetermined number of times (e.g., once or twice), access her data within a time frame (e.g., an hour, a week, or a day), etc.

On the other hand, when the application data 620" is stored at Alice's DID management module 630, by default, the application 620" still may not have any access to Alice's personal data 661, 662, or 663 without a permission. In such a case, even though the application 620" is installed at Alice's DID management module 630, before the application 620" may be executed, Alice 640 and/or her DID management module 630 still must grant a scope of permission to the application 620" to access a portion of Alice's personal data 661, 662, and 663.

After a scope of permission is granted to the installed application 620' and/or 620", the application 620' and/or 620" may be executed in Alice's personal storage 660 and/or Alice's DID management module 630. Once the application 620' is executed (using a portion of Alice's personal data as one or more inputs), one or more results may be generated. For example, the insurance quoting application 620 may generate one or more quotes for different insurance coverages or plans. These results are probably what Alice would like to review. Thus, these one or more results may be sent to Alice 640. Many different communication methods may be implemented for Alice 640 to receive the one or more results. For example, the results may be sent to Alice 640 via Alice's DID management module 630. The results may also be sent to Alice 640 via an email, SMS, voice service, etc.

In some embodiments, the results may be stored in Alice's personal storage 660 (e.g., application output storage 627) and/or Alice's DID management module 630 (e.g., application output storage 638). For example, the one or more results may be stored in an application output storage 627 at Alice's personal storage 660. Alternatively, or in addition, the one or more results may be stored in an application output storage 638 at Alice's DID management module 630. Alternatively, the one or more results may be stored with the application data 620' or other Alice's personal data 631, 632 and/or 633. For example, Alice's auto insurance quotes generated by the application 620' may be stored with the application data 620'. As another example, Alice's auto insurance quotes that are based on Alice's driving records may be stored with Alice's driving records 661; Alice's medical insurance quotes that are based on Alice's medical records may be stored with Alice's medical records 663, etc.

Further, in many situations, the application 620's provider (i.e., entity 610) may also want to access the generated one or more results. However, since the application 620 is stored and/or installed at Alice's personal storage 660 or her DID management module 630, the one or more results are completely controlled by Alice 640 via her DID. In some embodiments, after the one or more results are generated, the entity 610 may send a request to request Alice 640's DID management module 630 and/or Alice's personal storage 660 to allow the entity 610 to have access (e.g., read access) to the one or more results generated by the application 620.

For example, if the one or more results 672 are stored in the application output storage 627 at Alice's personal storage 660, Alice's DID management module 630 and/or her personal storage 660 may automatically grant or deny the request for access the one or more results 672 based on the characteristics 621 of the application. Alternatively, Alice's DID management module 630 may send a notification to Alice 640 to ask Alice 640 to grant or deny the request of entity 610 on the fly.

In some situations, Alice 640 may grant the entity 610 to access a portion of the results generated by the application 620. For example, the DID management module 630 and/or Alice's personal storage 660 may anonymize certain information in the one or more results 672 and send the anonymized results to the entity 610.

In some embodiments, when the entity 610 and/or the application 620 requests for a permission to install the application 620 in Alice's personal storage 660 or Alice's DID management module 630, the entity 610 and/or the application 620 may also request for access to the one or more results at the same time. The entity 610 and/or the application 620 may only store and/or install the application 620 if the entity 610 and/or the application 620 is granted a permission to access the one or more results that are to be generated by the application 620. For example, before the entity 610 and/or the application 620 stores and/or installs the application 620 in Alice's personal storage 660, the entity 610 and/or the application 620 may request Alice's personal storage 660 to dedicate a storage area to store the one or more results that are to be generated, and grant the entity 610 and/or the application 620 at least a read access to the dedicated storage for at least a period of time and/or a number of times after the application 620 is run.

In such a case, even though Alice 640 may allow the entity to receive the one or more results generated from the application 620, the entity 610 and/or the application 620 itself still do not have direct access to Alice's personal data that was used to generate the one or more results. Thus, an additional layer of security is provided to DID owners (e.g., Alice 640).

Further, in some embodiments, when the DID management module 630 or the personal storage 640 determines to grant or deny requests for permissions from the entity 610 and/or entity 620, the determination is based on one or more pre-defined permission rules. Alice may define part or all of the permission rules via her DID management module 630. Alice's DID management module 630 may automatically generate and store one or more default permissions rules. These rules may be stored in a permission storage 631 at Alice's DID management module 630, and/or stored in the permission storage 667 at Alice's personal storage 660. For example, the permission storage 631 at the DID management module 630 may store permission rule 632 and 633. The ellipsis 634 represents that there may be any number of permission rules that may be stored at Alice's DID management module. Alternatively, or in addition, the permission storage 667 at Alice's personal storage 660 may store permission rules 668 and 669. The ellipsis 671 represents that there may be any number of permission rules that may be stored at Alice's personal storage 660.

In addition to expressly granted permissions, Alice 640 may also have a blacklist of applications and/or entities and/or type of applications and/or entities that she wants to deny their requests to store the corresponding application in Alice's personal storage 660 at all time. Such information may also be stored in the permission storage 631 and/or 667. Once one of these applications requests to store and/or install the corresponding application in her personal storage 660, her DID management module 630 and/or her personal storage 660 may automatically deny the request without further input from Alice 640.

The permissions (and/or non-permissions) (e.g., one of the permissions 632, 633, 668 and/or 669) may be stored in any specific data structure depending on what information and how much information the permission storage is designed to store. As a simple example, the permissions 632, 633, 668 and/or 669 may be stored as a table. Each entry of the table may include an identifier of each specific application 620, an identifier of the associated entity 610, and the scope of the permission. The scope of the permission may include a specific portion of the data and/or a specific type of data that is allowed to be accessed by the application, what type of permission (e.g., read, write, make copy, etc.) is granted, how many times the data and/or data storage is allowed to be accessed (e.g., once or twice, etc.), the time frame during which the data and/or data storage is allowed to be accessed (e.g., 24 hours, one week, one month, etc.). For the applications and/or entities that are grounded to access any data and/or data storage, the scope of permission would be that no data storage is allowed to be accessed at any time.

The permissions 632, 633, 668 and/or 669 also be one or more permission rules that may be applicable to a type of applications or all of the applications. For example, one of the permissions (or permission rules) may be that no permissions should be granted during weekends or after 7 pm in the evening, such that Alice 640 will not receive potentially interrupting notifications. Another example, Alice 640 may set a permission rule that no permission should be granted to any insurance company.

The permissions 632, 633, 668 and/or 669 may also be defined based on the type of data the application has requested, the type of business that the entity does, and the field and/or purpose of the application. For example, Alice 640 may define that if an application (e.g., application 620) requires to access Alice 640's social security number and/or date of birth, such a request will be automatically denied unless Alice 640 has expressly defined the permission in the permission storage.

If one of the rules applies to at least one of the characteristics of the application 620, the DID management module 630 may automatically grant or deny the write permission request. For example, Alice 640 may set up a permission rule 632 and/or 668 to grant the entities that she currently does business with to store and/or install their applications in her personal storage 660 or her DID management module. Additionally, Alice 640 may also set up a permission rule to specify that even though the application is allowed to be installed, she still needs to manually grant the application the scope of permission to access her personal data. Alternatively, Alice 640 may also specify additional permission rules that may automatically grant certain application a scope of permission to use a portion of her personal data 661, 662, and 663 to generate one or more results.

As another example, Alice 640 may set up some rules to grant government entities with write permissions to store and/or install their applications in her personal storage 660 or her DID management module 630. Further, there may be additional rules set up to grant each particular government entity a specific scope of permission to access her personal data. For example, the IRS's application may be allowed to access Alice's income data, the DMV's application may be allowed to access Alice's driving records 661, etc.

Furthermore, there may be rules that are related to the technical limitations of the devices that hosts Alice's DID management module 630 and/or Alice's personal storage 660. For example, Alice's personal storage may include a large storage. Her DID management module 630 may be a phone app. Thus, her DID management module 630 is limited to the storage of her phone. When the application 620 requires a large storage space (e.g., greater than a pre-determined amount of storage), the application 620 may be required to be stored at Alice's personal storage 660; and when the application 620 requires a small storage space (e.g., less than a pre-determined amount of storage) the application 620 may be stored at Alice's DID management module 630. As another example, when the application 620 requires to access a large amount of Alice's personal data (e.g., greater than a pre-determined amount of Alice's personal data), it may be better to store and/or install it next to Alice's personal data 661, 662 and 663, i.e., be stored/installed at Alice's personal storage 660. When the application 620 does not require to access a large amount of Alice's personal data (e.g., less than a pre-determined amount of Alice's personal data). Alternatively, or in addition, Alice 640 may indicate where the application 620 should be stored or installed each time or at some times.

Alice 640 may also set up her DID management module 630 and/or his/her personal storage 660 to generate a notification whenever an express permission cannot be found in the permission storage(s) 631 and/or 667. After Alice receives a notification, she can grant or deny the request on the fly. The permission storage 631 in the DID management module 630 and/or in the permission storage 667 in the DID owner's personal storage 660 may also be configured to automatically store or backup the permissions generated or the denied request by Alice 640 on the fly.

In some cases, the permission may be a permission to allow an application 620 to install the application 620 in Alice's personal storage 660 and to update the application 620 for a number of times or a period of time. For example, Alice's insurance company 610 may be granted a permission to install the renewal quote application 610 and allow it to update the renewal quote application 620 once or twice in the future (or for a year) when a next renewal occurs. Once the number of times and period of time is reached, the permission is no longer an active permission. Such an expired permission may be changed to an inactive status or be moved to a separate table or storage area, because the expired permission will not be used directly by the DID management module 630 and/or the personal storage 660 to grant another application access again. However, the backed up permission data may still be analyzed by the DID management module 630 and/or the personal storage 660 to recommend or suggest Alice 640 whether a permission and/or what scope of permission should be granted to an application that is similar to a previous application.

After receiving the recommended scope of permission, Alice 640 may then indicate whether she accepts the recommended scope of permission or that denies the recommended scope of permission. Alternatively, Alice 640 may modify the recommended scope of permission to a different scope of permission. The recommendations may be populated in the DID management module 630 (e.g., a mobile app), or be sent to Alice 640 via SMS, email, voice mail, etc. Alice 640 may interact with the recommendation populated in the DID management module 630 to accept and/or deny it. Alice 640 may also reply to an SMS or email with a short "yes" or "no" text and/or use voice command during a voice call to accept and/or deny the recommendation. Alice 640 may also interact with the recommendation populated in the DID management module 630 to modify the recommended scope of permission. Simple modifications may also be entered via replying a text and/or email message, or using voice commands to interact with a voice call.

In some embodiments, the DID management module 630 and/or the personal storage 660 may give Alice 640 a number of recommendations that Alice 640 can choose from. Thus, Alice 640 may select one of the recommended scopes of permission by interacting with the DID management module 630, responding to a text or email message, and/or using voice command to interact with a voice call.

Furthermore, in some embodiments, Alice 640 may allow the DID management module 630 and/or personal storage 660 to compare a new application with another application recorded in the permission storage, and automatically permit the new application 620 that is similar to a previously permitted application, or permit the new application 620 that is associated with an entity 610 that is the same as that of a previously permitted application. Alternatively, or in combination, the DID management module 630 and/or personal storage 660 may generate a notification showing Alice 640 that the application 620 is similar to a previously permitted application and ask Alice 640 whether she would like to allow this new application to access the similar type of data that Alice 640 previously has granted the other application to access.

In some embodiments, at least some of the entities 610 and/or the applications 620 may also be associated with a DID (e.g., a second DID and/or a third DID). As such, the entity 610 and/or the application 620 may also be a DID owner 201 described in FIGS. 2-4, and the DID of the entity 610 or the application 620 may be a DID 205 described in FIGS. 2-4. In such a case, the identifying the one or more characteristics 621 of the application may include identifying and/or verifying the DID of the entity 610 and/or DID of the application 620. For example, if the DID of the entity 610 or the DID of the application 620 can identify and/or verify that the entity 610 is a legitimate bank that Alice 640 wants to extend personal credit from, Alice's DID management module 630 may grant the permission to the application 620 based on the DID of the entity 610 and/or the DID of the application 620. The permissions 632, 633, 668 and/or 669 stored in the permission storage 631 and/or 667 may include the DID of the entity 610 and/or the DID of the application 620 that is granted a write permission to store and/or install an application in the application storage 624 and/or 635, and/or grant a scope of data access permission that the installed application is granted.

Additionally, in some embodiments, after the scope of permission (e.g., one of the permissions 632-633 and/or 668-669) is granted, and/or the requested user data 661-663 is accessed, another notification may be sent to Alice 640. Depending on Alice 640's preference, the notification may include detailed scope of the permission (e.g., one of the permissions 632-633 and/or 668-669) granted, the identity and other information about the entity 610, and/or information about the application 620. Alternatively, the notification may be a simple notification merely indicating that a permission (e.g., one of the permissions 632-633 and/or 668-669) has been granted. After receiving the notification, Alice 640 may have a second thought about the permission granted and may want to change the granted scope of permission. In some embodiments, the system may allow Alice 640 to update the granted permission. For example, the permission may be allowing an application to be installed and remain in the application storage 624 for a month, and Alice 640 may want to change her mind and update the permission to only last one week. In some embodiments, Alice 640 may be able to interact with the notification directly to update the granted permission. Alternatively, or in addition, Alice 640 may also be able to update and/or revoke the granted permission (e.g., one of the permissions 632-633 and/or 668-669) record stored in the permission storage 631 and/or 667 at any time.

The following discussion now refers to a number of methods and method acts that may be performed. Although the method acts may be disused in a certain order or illustrated in a flow chart as occurring in a particular order, no particular ordering is required unless specifically stated, or required because an act is dependent on another act being completed prior to the act being performed.

Figure 7:
FIG. 7 illustrates a flow chart of an example method for storing and executing an application in a DID owner's personal storage with the DID owner granted permission.

FIG. 7 illustrates a flowchart of a method 700 for storing and executing an application in a DID owner's personal storage with the DID owner granted permission. The method 700 includes receiving a request from an entity for storing an executable application in a data storage that is associated with an owner of a first DID (act 701). For example, as illustrated in FIG. 6, the entity may be the entity 610, the application may be the application 620, the owner of the first DID may be Alice 640, and the personal storage may be Alice's personal storage 660. The entity 610 sends a request for storing the executable application 620 in the application storage 624 at Alice's personal storage 660. The act 701 may be the act of receiving the request for storing the executable application 620 from the entity 610.

The method 700 also includes identifying one or more characteristics of the application (act 702). For example, the application 620 may include one or more characteristics 621. Alice's DID management module 630 and/or Alice's personal storage 660 may be able to identify the one or ore characteristics 621 of the application by requesting the characteristics 621 from the entity 610 and/or the application 620. Alternatively, or in addition, Alice's DID management module 630 and/or Alice's personal storage 660 may be able to obtain the one or more characteristics 621 by reading the metadata of the application 620.

Based on the identified one or more characteristics, a determination of whether the executable application is allowed to be stored in the data storage is made (act 703). For example, as illustrated in FIG. 6, Alice's DID management module 630 and/or Alice's personal storage 660 may make such a determination automatically (e.g., based on one or more permission rules 632, 633, 668, and/or 669 recorded in the permission storage 631 and/or 667). Alternatively, Alice's DID management module 630 and/or Alice's personal storage 660 may notify Alice 640, and Alice 640 may then make the determination on the fly.

Based on the determination, a write permission is then granted to the entity to write the executable application in the data storage (act 704). For example, Alice's DID management module 631 may grant the write permission to the entity 610 to store and/or install the application 620 in the application storage 624 at Alice's personal storage 660. Thereafter, the entity the stores the executable application in a portion of the data storage (act 705). For example, the entity 610 stores and/or installs the application 620 in the application storage 624 at Alice's personal storage 660 as application 620'.

After the executable application is stored in the data storage, the installed application is completely controlled by the owner of the DID. The owner of the DID, the data storage that is associated with the owner of the DID, or the management module of the DID owner may allow or deny an execution of the application using data stored in the data storage. When the execution of the application is allowed, the application 620' is executed using the data stored in the data storage as one or more input to generate one or more results (act 706). For example, Alice 640, her personal storage 660, and/or her DID management module 630 may determine whether the installed application 620' may be executed using Alice's personal data 661, 662, and/or 663 stored in her personal storage 660. If the execution of the application 620' is allowed, the application 620' may use some of Alice's personal data 661, 662, and 663 as one or more inputs to generate one or more results.

Figure 8:
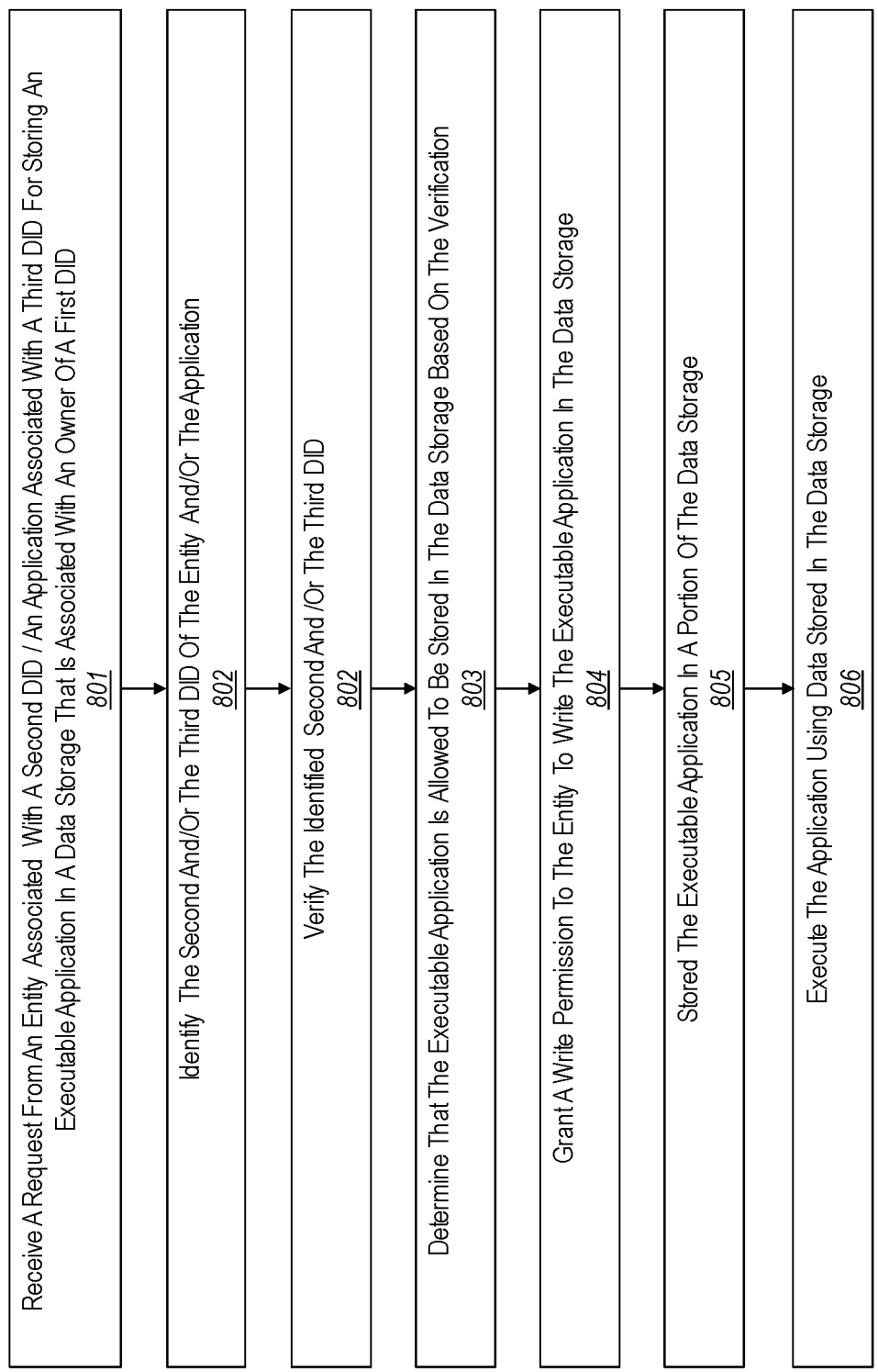
FIG. 8 illustrates a flow chart of an example method for storing and executing an application in a DID owner's personal storage with the DID owner granted permission, wherein the application and/or the entity that provides the application is also associated with a DID.

FIG. 8 illustrates a flowchart of an example method 800 for storing and executing an application in a DID owner's personal storage with the DID owner granted permission, where the application and/or the entity that provides the application is also associated with a DID. For example, the entity that provides the application may be associated with a second DID, and the application may be associated with a third DID.

The method 800 includes receiving a request from an entity associated with a second DID and/or an application associated with a third DID for storing an executable application in a data storage that is associated with an owner of a first DID (act 801). For example, as illustrated in FIG. 6, the owner of the first DID may be Alice 640; the entity may be the entity 610, which is associated with a second DID; the application may be the application 620, which is associated with a third DID. Alice's personal storage 660 and/or Alice's DID management module 630 may receive a request from the entity 610 (associated with the second DID) and/or the application 620 (associated with the third DID) for storing the executable application 620 in the application storage 624 at Alice's personal storage 660.

The method 800 may also include identifying the second DID of the entity and/or the third DID of the application (act 802). For example, Alice's DID management module 630, Alice's personal storage 660 and/or the ID hub 650 may identify the DID associated with the entity 610 and/or the DID associated with the application 620.

The method 800 may also include verifying the second and/or the third DID (act 803). For example, the request may be signed by the second and/or third DID's private key, and the signed request may be verified by using the second and/or third DID's public key. Once the second and/or third DID are verified, the identity of the entity (e.g., entity 610) and/or the application (e.g., application 620) will be known. For example, the application 620 may be an application for filing a tax return. The entity 610 may be the federal government. The request for storing the application 620 in Alice's personal storage 660 may be signed by the private key of the federal government 610's DID. The Alice DID management module 630 may verify the identity of the second DID using the public key of the federal government 610. Thus, based on the DID of the federal government 610, the identity of the entity 610 may be identified and verified as the federal government.

The method 800 further includes determining that the executable application is allowed to be stored in the data storage based on the verification. For example, After the entity 610 (e.g., the federal government)'s identity is verified via the DID verification process, Alice's DID management module 630 may determine that the application 620 (e.g., a tax return application) is allowed to be stored in the application storage 624 at her personal storage 660.

Thereafter, the executable application is then stored in a portion of the data storage. For example, the tax return application 620' is stored and/or installed in the application storage 624 at Alice's personal storage 660.

At some point, an execution of the application may be allowed or denied by the DID owner, DID management module and/or the DID owner's personal storage. If the execution of the application is allowed, the application is executed using the DID owner's personal data as one or more inputs to generate one or more results (act 806). For example, in some embodiments, Alice's personal storage 660 and/or Alice's DID management module 630 may allow or deny an execution of the application using data stored in the data storage at the time the write permission was granted. In some embodiments, Alice's personal storage 660 and/or Alice's DID management module 630 may allow the storage of the application 620' in the personal storage first, and then determine whether the execution of the application 620' is allowed at any time, or the usage of any portion of Alice's personal data 661, 662, and 663 should be granted to the application 620'. If the usage of a portion of Alice's personal data 661, 662, and 663 is granted, the application 620 will use the portion of Alice's personal data 661, 662, and 663 as one or more inputs to generate one or more results.

Figure 9:
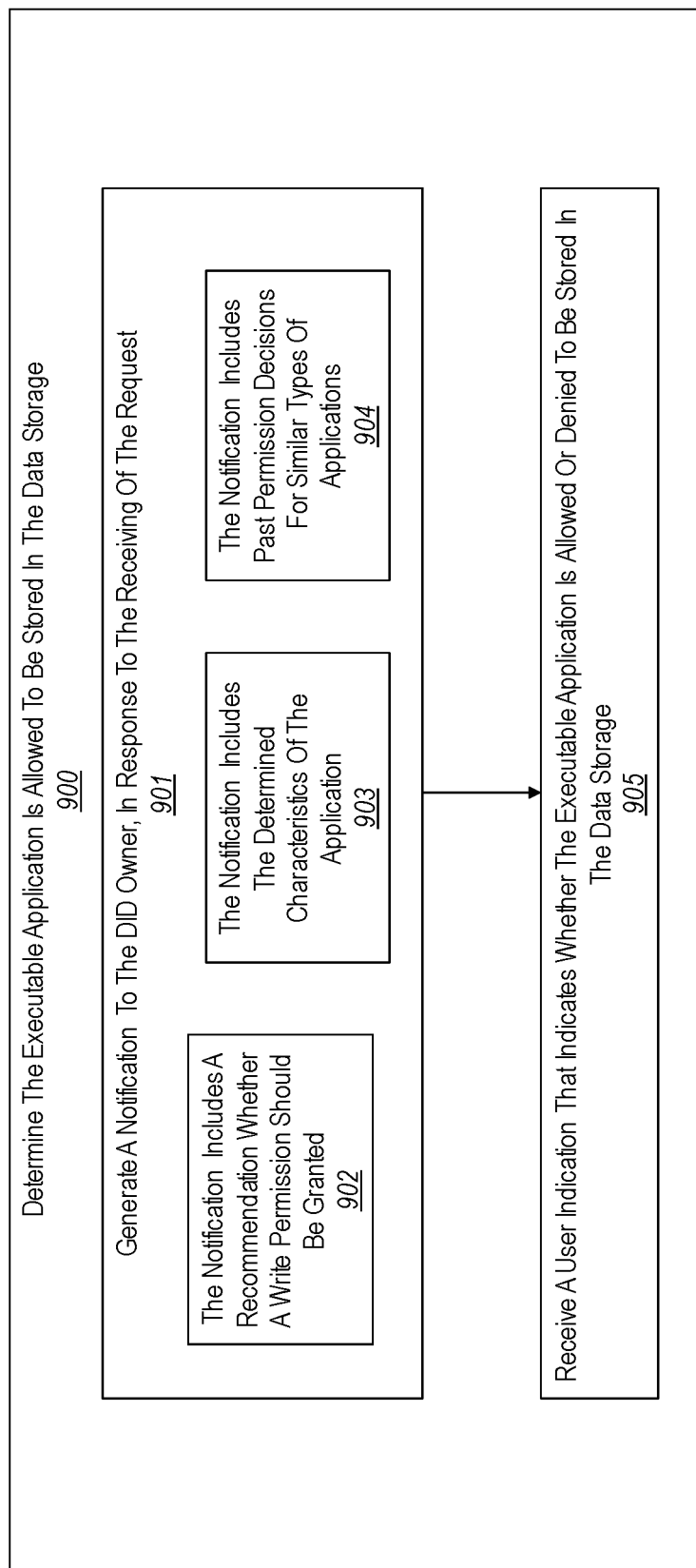
FIG. 9 illustrates a flow chart of an example method for determining the executable application is allowed to be stored in the data storage.

FIG. 9 illustrates a flowchart of an example method 1000 for determining whether the executable application is allowed to be stored in the data storage, which may correspond to the act 703 of method 700 and/or act 803 of method 800. The method 900 includes generating a notification to the DID owner, in response to the receiving of the request (act 9001). For example, after the entity 610 and/or the application 620 requests for a write permission to store the application 620 in Alice's personal storage 660, Alice's DID management module 630 and/or Alice's personal storage 660 may generate a notification and send the notification to Alice 640. The notification may be generated within the DID management module 630 (e.g., a phone app). Alternatively, or in addition, the notification may be generated via other communication methods, such as SMS, email, voice service, etc.

Furthermore, the notification may include additional information that may be a recommendation whether a write permission should be granted (902). For example, the recommendation may be determined by the DID management module 630 and/or the personal storage 660 based on the permission rules 632, 633, 668 and/or 669 stored in the permission storage 631 and/or 667. The notification may also include the determined characteristics of the application (903), and/or the past permission decisions for similar types of applications (904).

After the notification is set to the DID owner, the DID owner may input a user indication that indicates whether the executable application is allowed or denied to be stored in the data storage. For example, Alice 640 may receive a notification about the request from the entity 610 and/or the application 620, and then input her own decision of whether she would like to have the application 620 to be stored and/or installed in her application storage 624 at her personal storage 660. Alice 640 may be able to interact with the notification directly by indicating accepting or denying the recommendation. For example, the notification sent to Alice via her DID management module 630 may include a recommendation of allowing the request, at the same time, the notification may also include an accept button and a deny button for Alice to click to quickly allow the request or deny the request.

Figure 10:
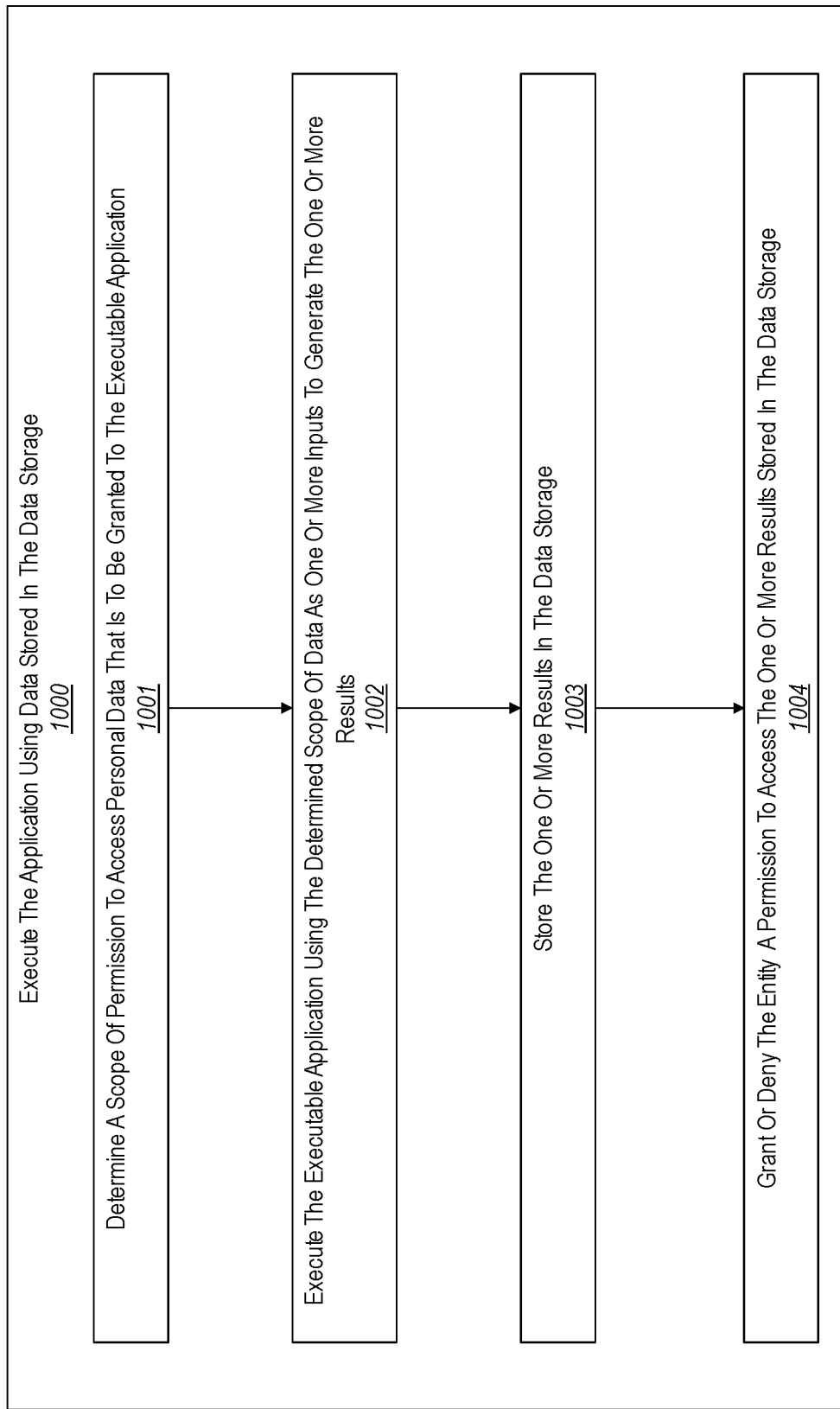
FIG. 10 illustrates a flow chart of an example method for executing the application stored in the data storage.

FIG. 10 illustrates a flowchart of an example method 1000 for executing the application stored in the data storage, which may correspond to the act 706 of method 700 and/or act 806 of method 800.

The method 1000 includes determining a scope of permission to access personal data that is to be granted to the executable application (act 1001). For example, Alice's DID management module 630 and/or Alice's personal storage 660 may automatically determine a scope of permission based on the permission rules 632, 633, 668, 669 stored in the permission storage 631 and/or 667. The determination may also be made by Alice 640 on the fly.

Once the scope of permission to access personal data is determined, the executable application is then executed using the determined scope of data as one or more inputs to generate the one or more results (act 1002). For example, the application 620' may be a tax return application, and the scope of data determined may be Alice's income data. The tax return application 620' is then executed using Alice's income data as one or more inputs to generate information related to information related to her tax refund or tax owed to the government.

Thereafter, the one or more results are stored in the data storage (act 1003). For example, Alice's tax refund results are stored in her personal storage 660. Such results may be stored with her income data or be stored at the application output storage 627.

Finally, the entity that provided the application may be granted or denied a permission to access the one or more results stored in the data storage (1004). For example, the government who provided the tax return application would want to receive the tax return amount that Alice is entitled or the tax amount that Alice owes. Alice's DID management module 630 and/or Alice's personal storage 660 may automatically determine whether the government 610 should be granted a permission to access the tax return results generated by the application 620. Alternatively, Alice 640 may input the permission or denial on the fly. For example, if the result is that Alice is entitled a an amount of tax refund, the government 610 is granted a permission to access the result automatically; and if the result is that Alice owes an amount of tax to the government, the government 610 is not granted a permission to access the result, and Alice 640 must personally grant the permission to the government 610.

For the processes and methods disclosed herein, the operations performed in the processes and methods may be implemented in differing order. Furthermore, the outlined operations are only provided as examples, an some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable hardware storage devices having thereon computer-executable instructions that are structured such that, when executed by the one or more processors, configure the computing system to:
   receive a request from an entity for storing an executable application in a data storage that is associated with an owner of a first decentralized identifier (DID), the executable application being configured to use a portion of personal data stored in the data storage as one or more inputs to generate one or more results, wherein the entity is an owner of a second DID, and the data storage is provided by a decentralized service that uses DIDs and a distributed ledger to authorize or authenticate users who are owners of DIDs;
   identify one or more characteristics of the executable application associated with the entity;
   based on the identified one or more characteristics, determine if the executable application is allowed to be stored in the data storage;
   grant a write permission to the entity to write the executable application in the data storage, wherein when the write permission is granted to the entity, the write permission is recorded in the distributed ledger as data associated with the second DID;
   store the executable application in the portion of the data storage; and
   execute the stored executable application using the portion of personal data stored in the data storage to generate one or more results.

2. The computing system of claim 1, wherein the executing the stored executable application comprises:
   determining a scope of permission to access personal data that is to be granted to the executable application, and;

allowing or denying the executable application to use the portion of personal data.

3. The computing system of claim 2, wherein executing the stored executable application comprises:
when the determined scope of data includes data required by the executable application, provide the executable application with the determined scope of data, and run the executable application using the determined scope of data to generate the one or more results.

4. The computing system of claim 3, wherein executing the stored executable application comprises:
storing the one or more results in the data storage.

5. The computing system of claim 4, wherein executing the stored executable application comprises:
granting or denying the entity a permission to access the one or more results stored in the data storage.

6. The computing system of claim 1, wherein the entity is associated with a second DID that is different than the first DID, and
wherein identifying one or more characteristics of the application includes identifying the second DID of the entity.

7. The computing system of claim 1, wherein the application associated with the entity is associated with a third DID, and
wherein identifying characteristics of the application includes identifying the third DID of the application.

8. The computing system of claim 1, wherein the write permission includes at least one of the following:
an amount of data permitted to be written by the entity;
allowing the entity only to write data related to the executable application;
allowing the entity only to write data within a predetermined time frame; and
allowing the entity only to write data for a predetermined number of times.

9. The computing system of claim 1, wherein the computing system is further caused to:
in response to the request from the entity, generate a notification to the owner of the first DID that the request has been received.

10. The computing system of claim 9, wherein the user notification includes a recommendation of whether the executable application should be allowed to be stored in the data storage.

11. The computing system of claim 9, wherein the computing system is further caused to:
receive an indication from the owner of the first DID that accepts or denies the recommendation.

12. The computing system of claim 1, wherein the computing system is further caused to:
receive an indication from the owner of the first DID indicating whether the executable application is allowed to be stored in the data storage.

13. The computing system of claim 1, wherein the computing system is further caused to:
generate a notification after the receiving the executable application.

14. The computing system of claim 1, wherein the computing system is further caused to:
generate a notification after the one or more results are generated.

15. A method for storing and executing an application in a user's personal storage with user granted permission, the method comprising:
receiving a request from an entity for storing an executable application in a data storage that is associated with an owner of a first decentralized identifier (DID), the executable application being configured to use a portion of personal data stored in the data storage to generate one or more results, wherein the entity is an owner of a second DID, and the data storage is provided by a decentralized service that uses DIDs and a distributed ledger to authorize or authenticate users who are owners of DIDs;
identifying one or more characteristics of the executable application associated with the entity;
based on the identified one or more characteristics, determining if the executable application is allowed to be stored in the data storage;
granting a write permission to the entity to write the executable application in the data storage, wherein when the write permission is granted to the entity, the write permission is recorded in the distributed ledger as data associated with the second DID;
storing the executable application in a portion of the data storage; and
executing the stored executable application using the portion of personal data stored in the data storage to generate one or more results.

16. The method of claim 15, wherein executing the stored executable application comprises:
determining a scope of permission to access personal data that is to be granted to the executable application, and;
allowing or denying the executable application to use the portion of personal data.

17. The method of claim 16, the method further comprising:
when the determined scope of data includes data required by the executable application, providing the executable application with the determined scope of data, and running the executable application using the determined scope of data to generate the one or more results.

18. The method of claim 17, wherein the method further comprises storing the one or more results in the data storage.

19. The method of claim 18, wherein is the method further comprises granting or deny the entity a permission to access the one or more results stored in the data storage.

20. A computer program product comprising one or more hardware storage devices having stored thereon computer-executable instructions that are structured such that, when executed by one or more processors of a computing system, configure the computing system to perform at least:
receive a request from an entity for storing an executable application in a data storage that is associated with an owner of a first decentralized identifier (DID), the executable application being configured to use a portion of personal data stored in the data storage as one or more inputs to generate one or more results, wherein the entity is an owner of a second DID, and the data storage is provided by a decentralized service that uses DIDs and a distributed ledger to authorize or authenticate users who are owners of DIDs;
identify one or more characteristics of the executable application associated with the entity;
based on the identified one or more characteristics, determine the executable application is allowed to be stored in the data storage;
grant a write permission to the entity to write the executable application in the data storage, wherein when the write permission is granted to the entity, the write permission is recorded in the distributed ledger as data associated with the second DID;

store the executable application in a portion of the data storage; and execute the stored executable application using the portion of personal data stored in the data storage to generate one or more results.

* * * * *